(12) United States Patent
Indoh et al.

(10) Patent No.: US 10,818,180 B2
(45) Date of Patent: Oct. 27, 2020

(54) PARKING SUPPORT DEVICE

(71) Applicant: TOYOTA JIDOSHA KABUSHIKI KAISHA, Toyota-shi, Aichi-ken (JP)

(72) Inventors: Yuichi Indoh, Toyota (JP); Yusuke Kida, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 152 days.

(21) Appl. No.: 16/118,617

(22) Filed: Aug. 31, 2018

(65) Prior Publication Data
US 2019/0073902 A1 Mar. 7, 2019

(30) Foreign Application Priority Data
Sep. 6, 2017 (JP) .................. 2017-170775

(51) Int. Cl.
*B62D 15/02* (2006.01)
*G06K 9/00* (2006.01)
*G08G 1/01* (2006.01)
*G08G 1/04* (2006.01)
*G08G 1/14* (2006.01)
*H04N 7/18* (2006.01)

(52) U.S. Cl.
CPC .......... *G08G 1/143* (2013.01); *B62D 15/027* (2013.01); *B62D 15/0285* (2013.01); *G06K 9/00805* (2013.01); *G06K 9/00812* (2013.01); *G08G 1/0112* (2013.01); *G08G 1/04* (2013.01)

(58) Field of Classification Search
CPC .. B62D 15/027; B62D 15/0285; G08G 1/143; G08G 1/04; G08G 1/0112; G06K 9/00812; G06K 9/00805; H04N 7/181

USPC ........................................................ 701/117
See application file for complete search history.

(56) References Cited

U.S. PATENT DOCUMENTS

2013/0345954 A1* 12/2013 Tashiro .............. G01C 21/3492
701/117
2014/0244070 A1   8/2014 Inagaki et al.
(Continued)

FOREIGN PATENT DOCUMENTS

EP         2 428 431 A1    3/2012
JP        2012-217000 A   11/2012
(Continued)

*Primary Examiner* — Behrang Badii
*Assistant Examiner* — Hossam M Abd El Latif
(74) *Attorney, Agent, or Firm* — Sughrue Mion, PLLC

(57) ABSTRACT

A parking support ECU 10 detects a parking area based on a camera image acquired by cameras 20A through 20D for photographing a surrounding area of an own vehicle. The ECU displays a parking completed location to superimpose the parking completed location on the parking surrounding area. The parking completed location is a location of the own vehicle when parking to the parking area is completed. In the case where an obstacle having a height equal to or greater than a first threshold height H1th is present in the parking area, the ECU extrapolates, as the parking completed location, a location obtained by moving a normally completed location in an entering direction of the parking area by a specific distance which is determined based on a location of the obstacle. The normally completed location is the parking completed location when no obstacle is present in the parking area.

7 Claims, 12 Drawing Sheets

(56) References Cited

U.S. PATENT DOCUMENTS

| | | | |
|---|---|---|---|
| 2014/0333455 A1* | 11/2014 | Lee | B62D 15/028 340/932.2 |
| 2015/0307089 A1* | 10/2015 | Vorobieva | B62D 15/027 701/25 |
| 2016/0075327 A1* | 3/2016 | Kiyokawa | B62D 15/0285 701/301 |
| 2019/0215465 A1* | 7/2019 | Hayashi | H04N 7/181 |

FOREIGN PATENT DOCUMENTS

| JP | 2013-105179 A | 5/2013 |
|---|---|---|
| JP | 2014-166834 A | 9/2014 |
| JP | 2015-3565 A | 1/2015 |

* cited by examiner

PARKING SUPPORT DEVICE

BACKGROUND

Technical Field

The present invention relates to a parking support device/apparatus for displaying a parking completed location which is a location of own vehicle when parking of an own vehicle to a parking area/space is completed/finished, so as to support a parking operation of a driver of the own vehicle.

Related Art

Hitherto, a parking support device has been known, which displays the parking completed/finished location through superimposing the parking completed location on a "surrounding area image acquired by photographing a surrounding area around an vehicle" so as to support a parking operation of a driver.

For instance, as proposed in Japanese Patent Application Laid-open No. 2014-166834, the parking support device (hereinafter, referred to as a "conventional device") detects/finds a parking area/space in which the vehicle is able to be parked based on a camera image photographed by a camera and displays, as the parking completed location, the detected parking area in such a manner that the detected parking area is superimposed on the surrounding area image.

SUMMARY

In a case where an obstacle whose height is relatively high is present in the parking area, the driver finishes/ends a parking operation when the vehicle reaches a location at which the vehicle is close to the obstacle but does not contact the obstacle. Such obstacles include a utility/telegraph pole, a fence, a pole for a construction site, a standing signboard, a bicycle, or the like. In a case where an obstacle whose height is low is present in the parking area, the driver finishes/ends the parking operation when the vehicle reaches a location at which a wheel of the vehicle contacts the obstacle. Such obstacles include a wheel stopper, a stone, or the like. Meanwhile, the conventional device determines (extrapolate) the parking completed location regardless of whether or not the obstacle is present in the parking area. Therefore, the conventional device is likely to display the parking completed location different from an actual parking completed location at which the parking is actually finished. The driver of the vehicle to which the conventional device is applied finds/notices that the vehicle cannot be parked at the displayed parking completed location actually, after starting a parking operation for having the vehicle move toward the displayed parking completed location. Thereafter, when the driver judges that the actual parking location is inappropriate, for example, when the driver judges that the "vehicle which has been parked in the parking area" protrudes largely from the parking area to a lane, the driver has to perform the parking operation for having the vehicle be parked in another parking area again. As a result, the conventional device has a problem that such a repetition of the parking operation of the driver annoys the driver.

The present disclosure has been made to solve the problem described above. The present disclosure has an object to provide a parking support device which displays a parking completed location based on an obstacle present in the parking area on a display unit so as to be able to decrease an occurrence frequency of a situation where the driver has to redo the parking operation.

A parking support device (hereinafter, referred to as a "present disclosure device") according to the present disclosure comprises:

a detection unit (10, Step 800 through Step 895) for detecting, based on a camera image acquired by a camera (20) for photographing a surrounding area of an own vehicle, a parking area (PA) which has a size large enough for the own vehicle to be able to be parked;

a display unit (30) for displaying, based on the camera image, a parking surrounding area including the parking area; and a support unit (10, Step 1100 through Step 1195) for extrapolating a parking completed location which is a location of the own vehicle when parking to the parking area is completed, and for having the display unit display the extrapolated parking completed location so as to superimpose the extrapolated parking completed location on the parking surrounding area;

The support unit is configured to:

in a case where no predetermined height obstacle having a height equal to or greater than a predetermined first threshold height (H1th) is present in the parking area ("No" at Step 1215), extrapolate, as the parking completed location (FIG. 5 (A)), a normally completed location at which a whole vehicle body of the own vehicle is encompassed in the parking area when the own vehicle is parked; and in a case where the predetermined height obstacle is present in the parking area ("Yes" at Step 1215), extrapolate, as the parking completed location (either a contact prevention completed location shown in FIG. 5 (B) or a wheel stopper completed location shown in FIG. 5 (C)), an obstacle completed location which is a location determined by moving the normally completed location in an entering direction of the parking area by a specific distance which is determined based on a location of the predetermined height obstacle (Step 1235, Step 1250, Step 1255), the entering direction being a direction to an end of the parking area through which the own vehicle passes when the own vehicle enters the parking area.

According to the present disclosure device, when the predetermined height obstacle is present in the parking area, the obstacle completed location is displayed on the display unit as the parking completed location. The obstacle completed location is obtained by moving the normally completed location in the entering direction by "the specific distance determined based on the location of the predetermined height obstacle". Therefore, even if the predetermined height obstacle is present in the parking area, the driver can find/recognize the exact/accurate parking completed location before the driver starts a parking operation. Therefore, the present disclosure device can decrease a frequency/probability that the driver performs the parking driving operation again in order to park the own vehicle to a parking area different from an original parking area when the driver judges that an actual parking completed location is not appropriate after the driver has started the parking operation to park the own vehicle to the original parking area.

One embodiment of the present disclosure resides in that the support unit is configured to:

in a case where none of the predetermined height obstacle is present in a determination area (OA1) included in the parking area ("No" at Step 1215), extrapolate (Step 1220), as the normally completed location (FIG. 5 (A)), a location of the own vehicle when vertical parking is completed in such a manner that an opposite entrance end of the own vehicle coincides with a front end of the determination area, the determination area having a width (W) of the front end (PFE) which is within a range between a first left-right direction parking distance (LRPL=Ld1th) obtained by adding a predetermined first left-right clearance (LL+RL) to a width ON) of the own vehicle and a first front-rear direction parking distance (FRPL) obtained by adding a predetermined first front-rear clearance (FRL) to a length (L) of the own vehicle, and having a length from the front end in a rear direction which is equal to or longer than the first front-rear direction parking length, the opposite entrance end being either a front end or a rear end of the own vehicle and being opposite to an entrance end of the own vehicle from which the own vehicle firstly enters the parking area; and in a case where a first predetermined height obstacle (a wheel stopper obstacle S2), among the predetermined height obstacle, having a height which is smaller than a predetermined second threshold height (H2th) greater than the first threshold height is present in the determination area, and no second predetermined height obstacle, among the predetermined height obstacle, having a height which is equal to or greater than the second threshold height is present in the determination area, and if the opposite entrance end of the own vehicle protrudes from the parking area when the vertical parking is completed in such a manner that a wheel among wheels of the own vehicle, which is closer to the entrance end of the own vehicle, contacts with the first predetermined height obstacle which is the closest to the front end of the determination area, extrapolate (Step 1250), as the obstacle completed location (the wheel stopper completed location (FIG. 5 (C))), a location of the own vehicle when the vertical parking is completed in that manner.

According to this embodiment, in the case where the vertical parking is performed, "the location of the own vehicle when the vertical parking is completed such that the wheel which is nearer to the entrance end of the own vehicle among wheels of the own vehicle contacts with the first predetermined height obstacle" is displayed on the display unit as the parking completed location, when the first predetermined height obstacle having a height smaller than the second threshold height is present in the parking area. In the case where the opposite entrance end of the own vehicle does not protrude from the parking area (the determination area) when the own vehicle is parked at the parking completed location, the normally completed location is displayed on the display unit. As a result, in the case where the vertical parking is performed, even if "the obstacle (i.e. the wheel stopper) whose height is relatively low and which deters the own vehicle from moving in a rear direction of the parking area" is present, the driver can find/recognize the exact/accurate parking completed location before the driver starts a parking operation.

One embodiment of the present disclosure resides in that the support unit is configured to:

as described above, extrapolate (Step 1220), as the normally completed location (FIG. 5 (A)), a location of the own vehicle when vertical parking is completed in such a manner that an opposite entrance end of the own vehicle coincides with a front end of the determination area; and in a case where a first predetermined height obstacle, among the predetermined height obstacle, having a height equal to or greater than a predetermined second threshold height greater than the first threshold height is present in the determination area, and no second predetermined height obstacle (a contact obstacle S1), among the predetermined height obstacle, having a height smaller than the predetermined second threshold height is present, and if the opposite entrance end of the own vehicle protrudes from the parking area when the vertical parking is completed in such a manner that a distance between the entrance end and the second predetermined height obstacle which is the closest to the front end of the determination area coincides with the first front-rear clearance, extrapolate (Step 1235), as the obstacle completed location (the contact prevention completed location (FIG. 5 (B)), a location of the own vehicle when that vertical parking is completed in that manner.

According to this embodiment, in the case where the vertical parking is performed, when the second predetermined height obstacle having a height which is equal to or greater than the second threshold height, the own vehicle is parked at the location at which the own vehicle does not contact with the second predetermined height obstacle. This second predetermined obstacle is the obstacle which is relatively high, for example, a utility/telegraph pole, a fence, a pole for a construction site, a standing signboard, a bicycle, or the like. Therefore, in this case, "the location of the own vehicle when the vertical parking is completed such that the distance between the entrance end and the second predetermined height obstacle coincides with the first front-rear clearance" is displayed on the display unit as the parking completed location. As a result, in the case where the vertical parking is performed, even if "the obstacle which is relatively high and which contacts with a vehicle-body of the own vehicle" is present, the driver can find/recognize the exact/accurate parking completed location before the driver starts a parking operation.

One embodiment of the present disclosure resides in that the support unit is configured to:

as described above, extrapolate (Step 1220), as the normally completed location (FIG. 5 (A)), a location of the own vehicle when the vertical parking is completed; and in a case where a first predetermined height obstacle, among the predetermined height obstacle, having a height equal to or greater than a predetermined second threshold height greater than the first threshold height is present in the determination area, and a second predetermined height obstacle, among the predetermined height obstacle, having a height smaller than the predetermined second threshold height is present, extrapolate (Step 1235, Step 1250, Step 1255), as the obstacle completed location, either a first completed location (the wheel stopper completed location (FIG. 5(C)) and a second completed location (the contact prevention completed location (FIG. 5(B)), whichever causes a greater protrusion amount of the opposite entrance end from the front end of the determination area, the first completed location being a location of the own vehicle when the vertical parking is completed in such a manner that a wheel among wheels of the own vehicle, which is closer to the entrance end of the own vehicle, contacts with the first predetermined height obstacle which is the closest to the front end of the determination area, the second completed location being a location of the own vehicle when the vertical parking is completed in such a manner that a distance between the entrance end and the second predetermined height obstacle which is the closest to the front end of the determination area coincides with the first front-rear clearance.

In the case where the vertical parking to the parking area is performed, when the first predetermined height obstacle having a height smaller than the second threshold height and the second predetermined height obstacle having a height equal to or greater than the second predetermined height are present in the determination area of the parking area, the first completed location and the second completed location are extrapolated. The first completed location is a location of the own vehicle when the vertical parking is completed such that a wheel which is closer to the entrance end of the own vehicle among wheels of the own vehicle contacts with the first predetermined height obstacle. The second completed location is a location of the own vehicle when the vertical parking is completed such that a distance between the entrance end and the second predetermined height obstacle coincides with the front-rear clearance. The first completed location is extrapolated as the obstacle completed location, if the protrusion amount of the opposite entrance end of the own vehicle from the front end of the determination area when the own vehicle is parked at the first completed location is greater than the protrusion amount when the own vehicle is parked at the second completed location. In contrast, the second completed location is extrapolated as the obstacle completed location, if the protrusion amount when the own vehicle is parked at the second completed location is greater than the protrusion amount when the own vehicle is parked at the first completed location. Further, the obstacle completed location is displayed as the parking completed location. As a result, in the case where the vertical parking is performed, even if both "the obstacle which is relatively low and which deters the own vehicle from moving in a rear direction of the parking area" and "the obstacle which is relatively high and which contacts with a vehicle-body of the own vehicle" are present, the driver can find/recognize the exact/accurate parking completed location before the driver starts the parking operation.

One embodiment of the present disclosure resides in that the support unit is configured to set the second threshold height to a minimum ground clearance of the vehicle body of the own vehicle.

The second threshold height is set at the minimum ground clearance of the vehicle body of the own vehicle. Therefore, the first predetermined obstacle is an obstacle having a height smaller than the second threshold height is the obstacle which does not contact with the vehicle body but deters/restrains the own vehicle from moving in a rear direction of the parking area" is present, and the second predetermined obstacle is an obstacle having a height equal to or greater than the second threshold height which contacts with the vehicle body. According to the embodiment, the appropriate parking completed location for each of these obstacles is extrapolated. Therefore, more exact/accurate parking completed location can be displayed.

One embodiment of the present disclosure resides in that the support unit is configured to:
in a case where none of predetermined height obstacle is present in a determination area (OA2) included in the parking area ("No" at Step 1265), extrapolate (Step 1270), as the normally completed location, a location of the own vehicle when parallel parking is completed in such a manner that an opposite entrance end of the own vehicle coincides with a front end of the determination area,
  the determination area having a width of the front end (PFE) which is within a range between a second front-rear direction parking distance obtained by adding a predetermined second front-rear clearance (FFL+ FRL) to a length (L) of the own vehicle and a predetermined distance longer than the second front-rear direction parking distance, and having a length from the front end in a rear direction which is equal to or longer than a second left-right direction parking distance (APL) obtained by adding a predetermined second left-right clearance (LL or RL) to a width (W) of the own vehicle,
  the opposite entrance end being either a left end or a right end of the own vehicle and being opposite to an entrance end of the own vehicle from which the own vehicle firstly enters the parking area; and
in a case where the predetermined height obstacle is present in the determination area ("Yes" at Step 1265), extrapolate (Step 1280), as the obstacle completed location, a location (refer to FIG. 7) of the own vehicle when the parallel parking is completed in such a manner that a distance between the entrance end and the predetermined height obstacle (a parking deterring obstacle S3) coincides with a predetermined specific clearance.

In some embodiments, when the height of the predetermined height obstacle is equal to or greater than the second threshold height, the predetermined specific is set to the second left-right clearance. When the height of the predetermined height obstacle is smaller than the second threshold height, the predetermined specific is set to "0" or about "0".

In the case where the parallel parking is performed, when the predetermined obstacle is present in the determination area of the parking area, the location of the own vehicle when the parallel parking is completed such that the distance between the entrance end of the own vehicle and the predetermined height obstacle coincides with the predetermined specific clearance is displayed as the parking completed location. As a result, in the case where the parallel parking is performed, even if "the predetermined height obstacle is present, the driver can find/recognize the exact/accurate parking completed location before the driver starts the parking operation.

One embodiment of the present disclosure resides in that the support unit is configured to change a display mode of the parking completed location based on a protrusion amount (AOP) of an opposite entrance end of the own vehicle from the front end (PFE) of the determination area when the own vehicle is located at the extrapolated parking completed location,
  the opposite entrance end which is one end opposite to an entrance end from which the own vehicle enters the parking area and which is either a front end or a rear end of the own vehicle.

In examples of the embodiment described above, a color of a frame representing the parking completed location when the protrusion amount is relatively small can be different from a color of the frame when the protrusion amount is relatively great. Alternatively, the frame when the protrusion amount is relatively great is intermittently flashed. As a result, the change in the display mode of the parking completed location allows the driver to intuitively judge whether or not the protrusion amount of the own vehicle from the front end of the parking area is great.

One embodiment of the present disclosure resides in that the support unit is configured to display, on the display unit, the parking completed location in either a parking area which is the nearest to the own vehicle among a plurality of parking areas (Step 1135) or a parking area in which the own vehicle can be parked with the minimum number of times of cutting wheel required until the parking is completed among the plurality of parking areas (Step 1135 in modification example).

According to this embodiment, only the parking completed location in the parking area where the driver is highly likely to park the own vehicle is displayed on the display unit. Thus, the driver can easily visually recognize the appropriate parking completed location at which the driver should take a look.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAIL DESCRIPTION

Figure 1:
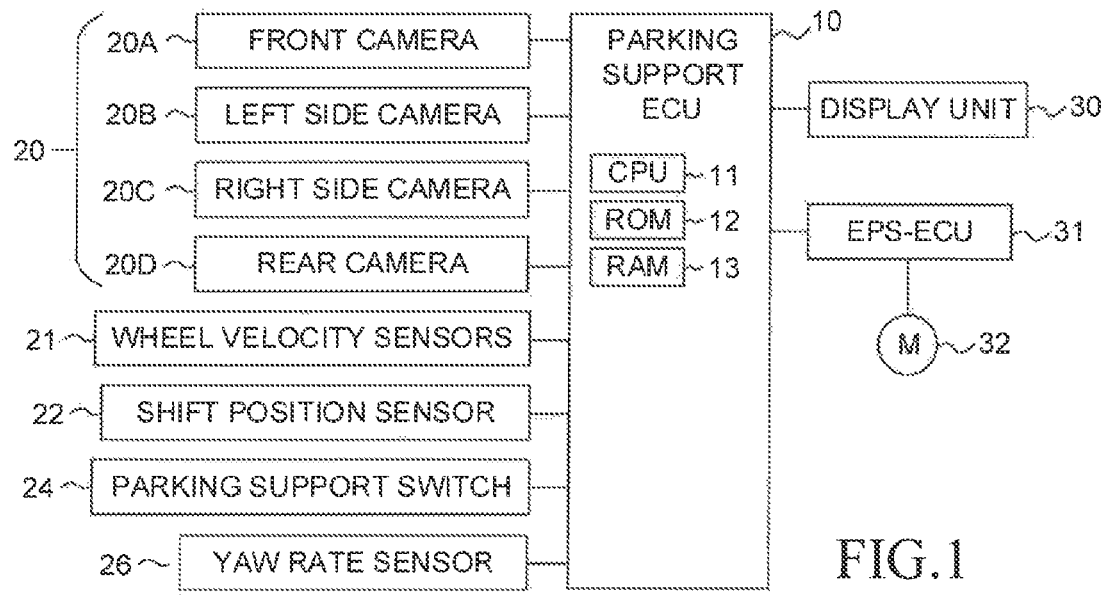
FIG. 1 is a schematic system configuration diagram of a parking support device according to an embodiment.

A parking support device (hereinafter referred to as "this support device") according to an embodiment of the present disclosure will next be described with reference to the accompanying drawings. A vehicle in which this support device is installed is referred to as an "own vehicle SV", when this vehicle needs to be distinguished from other vehicles. As shown in FIG. 1, this support device comprises a parking support ECU (hereinafter referred to as a "PSECU") 10. The PSECU 10 comprises a microcomputer including a CPU 11, a ROM 12, a RAM 13, and the like. It should be noted that an ECU is an abbreviation of an "Electronic Control Unit" which includes a microcomputer as a main part. The microcomputer includes a CPU and memories (for example, a ROM, a RAM, and the like). The CPU achieves/implements various functions by executing instructions (program, routine) stored in the ROM.

This support device further comprises a front camera 20A, a left side camera 20B, a right side camera 20C, a rear camera 20D, wheel velocity sensors 21, a shift position sensor 22, a parking support switch 24, a yaw rate sensor 26, a display unit 30, an electronic power steering ECU (EPS-ECU) 31, and a steering motor (M) 32. The front camera 20A, the left side camera 20B, the right side camera 20C, and the rear camera 20D are collectively referred to as "cameras 20", when they need not to be distinguished from each other. The PSECU 10 is connected to the cameras 20, the wheel velocity sensors 21, the shift position sensor 22, the parking support switch 24, the yaw rate sensor 26, the display unit 30, and the EPS-ECU 31.

Figure 2:
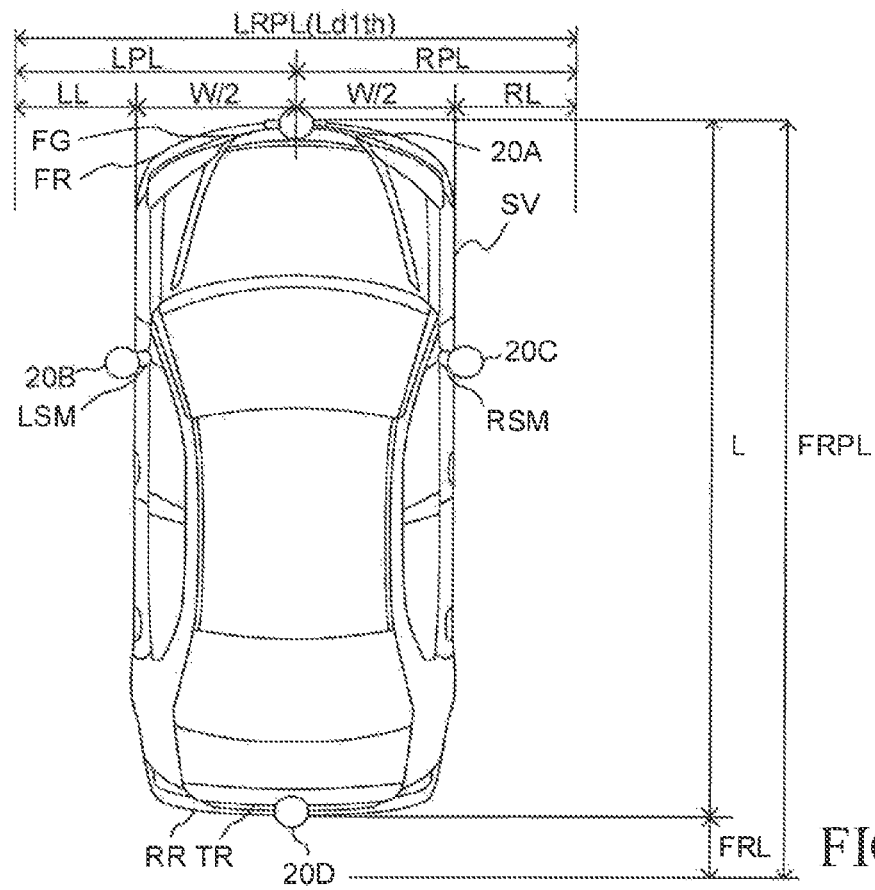
FIG. 2 is a diagram illustrating arranged positions of a front camera, a left side camera, a right side camera, and a rear camera shown in FIG. 1.

As shown in FIG. 2, the front camera 20A is arranged at the center of a front end FR of the own vehicle SV in a vehicle-width direction. Specifically, the front end FR is a front grill FG. The front camera 20A photographs a front area of the own vehicle SV to acquire a front camera image. The left side camera 20B is arranged on a left side of the own vehicle SV, specifically, on a left side mirror LSM. The left side camera 20B photographs a left side area of the own vehicle SV to acquire a left camera image. The right side camera 20C is arranged on a right side of the own vehicle SV, specifically, on a right side mirror RSM. The right side camera 20C photographs a right side area of the own vehicle SV to acquire a right camera image. The rear camera 20D is arranged at the center of a rear end RR of the own vehicle SV in the vehicle-width direction. Specifically, the rear end RR is a rear end of a trunk room TR. The rear camera 20D photographs a rear (back) area of the own vehicle SV to acquire a rear camera image. It should be noted that an angle of view of each of the cameras 20 is wide, i.e. about 180 deg.

Each of the cameras 20 photographs its respective/individual area to acquire a camera image (image data) of that respective area, and transmits the image date to the PSECU 10, every time a predetermined time period elapses. The PSECU 10 generates image data (hereinafter referred to as "3D (three dimensions) image data") on a 3D curved surface, corresponding to a surrounding/peripheral area of the own vehicle SV, based on the image data transmitted from the cameras 22. More specifically, the PSECU 10 projects each of pixel values of the image data transmitted from the cameras 20 to a pixel contained in the 3D curved surface which is semispherical. A relationship between each of the pixels of the image data transmitted from the cameras 20 and each of the pixel of the 3D curved surface is defined in advance. The PSECU 10 displays a parking support screen 300 (refer to FIG. 3) described later, using the generated 3D image data.

Such process for generating the 3D image data is widely-known (for example, refer to Japanese Patent Application Laid-open No. 2012-217000).

Each of the wheel velocity sensors 21 is provided in the corresponding one of the wheels. Each of the wheel velocity sensors 21 generates predetermined number of pulse signals (wheel pulse signals) per one rotation of the corresponding one of the wheels. The PSECU 10 calculates a rotation velocity (a wheel velocity) of each of the wheels, based on the number of the pulse signals transmitted from the corresponding one of the wheel velocity sensors 21 during a predetermined time period. Thereafter, the PSECU 10 calculates a vehicle velocity Vs indicative of a velocity of the own vehicle SV based on the wheel velocity of each of the wheels. For example, the vehicle velocity Vs is an average value of the wheel velocities of four wheels.

The shift position sensor 22 detects a position (hereinafter referred to as a "shift position SP") of a shift lever operated by the driver to transmit a signal indicative of the detected shift position. The shift position SP includes a parking range "P", a drive range "D", a reverse range "R", a neutral range "N", and the like. The PSECU 10 acquires (detects) the shift position from the shift position sensor 25, every time a predetermined time period elapses.

The parking support switch 24 is operated by the driver when the driver hopes a parking support, and provides a switch signal to the PSECU 10. The switch signal becomes a low level while the driver does not operate the parking support switch 24. The switch signal becomes a high level while the driver operates the parking support switch 24. The PSECU 10 reads out the switch signal to acquire "operation information as to whether or not the driver operates the parking support switch 24" from the parking support switch 24, every time a predetermined time period elapses.

The yaw rare sensor 26 detects a yaw rate Yr generated in the own vehicle SV to generate a signal indicative of the detected yaw rate Yr. The PSECU 10 acquires (detects) the yaw rate Yr from the yaw rate sensor 26, every time a predetermined time period elapses.

The display unit 30 is a touch panel. The display unit 30 receives display information from "various ECUs and a navigation device" installed in the own vehicle SV to display the display information on the touch panel. When a passenger of the own vehicle SV touches a screen of the touch panel, the display unit 30 receives an operation input corresponding to a touched position. The display unit 30 displays the parking support screen 300 for supporting the driver when the driver parks the own vehicle SV. When the display unit 30 receives a "display instruction signal which is an instruction to display the parking support screen 300" transmitted from the PSECU 10, the display unit 30 displays the parking support screen 300.

Figure 3:
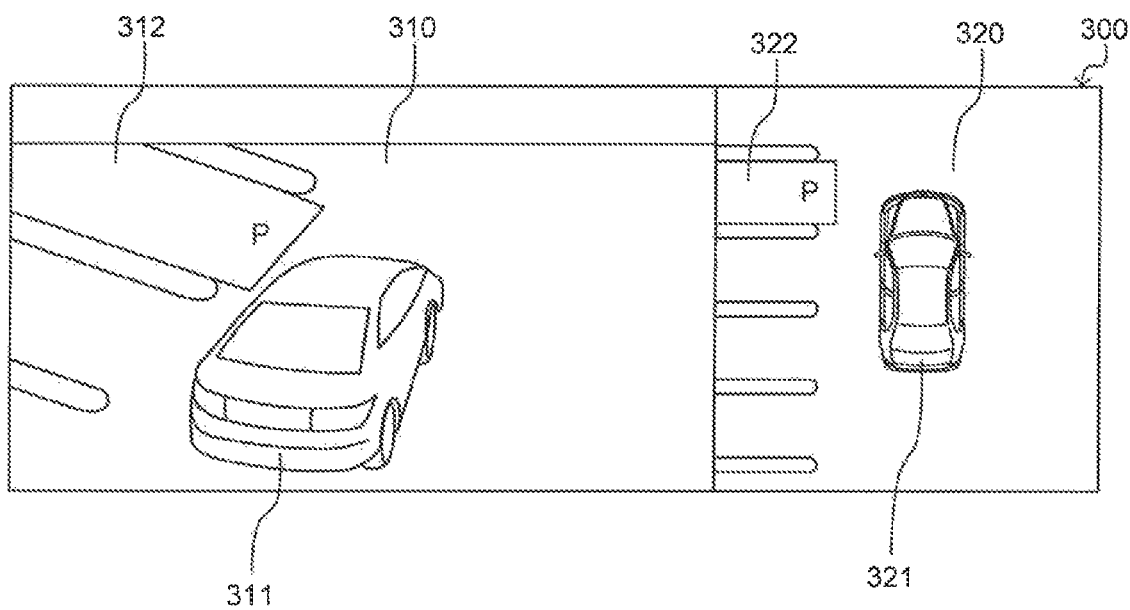
FIG. 3 is a diagram illustrating a parking support screen displayed on a display unit shown in FIG. 1.

As shown in FIG. 3, the parking support screen 300 includes a surrounding area screen 310 and a bird's-eye view screen 320. In the surrounding area screen 310, "an image corresponding to a parking surrounding area when viewed from a predetermined point in the 3D image data" is displayed. The parking surrounding area includes (encompasses) a display parking area DPA which is the parking completed location of the own vehicle SV and is to be displayed on the parking support screen 300. The display parking area DPA will be described later in detail. An "own vehicle icon (symbol) 311" is displayed in the vicinity of the center of the surrounding area screen 310. The own vehicle icon (symbol) 311 is an image corresponding to a 3D image data of the own vehicle SV when viewed from the above predetermine point." This 3D image data of the own vehicle SV is stored in the ROM 12 in advance. A location 312 of the own vehicle SV in the image of the parking surrounding area on the surrounding area screen 310 when the own vehicle completes the parking to the display parking area DPA is also displayed on the surrounding area screen 310 in the superimposed manner on the image of the parking surrounding area. The location of the own vehicle when the own vehicle completes the parking to the display parking area DPA is referred to as a "parking completed location". The parking completed location 312 is displayed as a rectangle frame whose size corresponds to a size of the own vehicle SV displayed on the surrounding area screen 310. The size of the own vehicle SV displayed on the surrounding area screen 310 is adjusted so as to correspond to a size of the display parking area DPA displayed on the surrounding area screen 310.

In the bird's eye view screen 320, "an image corresponding to a parking surrounding area when viewed from directly above the own vehicle SV in the 3D image data" is displayed. An "own vehicle icon (symbol) 321" is displayed in the vicinity of the center of the center of the bird's view screen 320. The own vehicle icon (symbol) 321 is an image corresponding to the 3D image data of the own vehicle SV stored in the ROM 12 in advance when viewed from directly above the own vehicle SV. The parking completed location 322 is displayed at a location corresponding to the display parking area DPA in the image of the parking surrounding area displayed on the bird's eye view screen 320. The parking completed location 322 is displayed as a rectangle frame whose size corresponds to a size of the own vehicle SV displayed on the bird's eye view screen 320, as with the parking completed location 312. The size of the own vehicle SV displayed on the bird's eye view screen 320 is adjusted so as to correspond to a size of the display parking area DPA displayed on the bird's eye view screen 320.

Referring back to FIG. 1, the EPS-ECU 31 is a controller of an well-known electric power steering system and is connected to a steering motor 32. The steering motor 32 is installed in an unillustrated steering mechanism of the own vehicle SV. The steering mechanism includes a steering wheel, a steering shaft connected to the steering wheel, a steering gear mechanism, and the like. The steering motor 32 generates torque in accordance with the electric power which is supplied from an unillustrated vehicle battery. The EPS-ECU 31 controls the direction of the electric power, the magnitude of the electric power, and the like. The torque generated by the steering motor 32 is used for generating steering assist torque and for turning steered wheels of the own vehicle SV.

<Outline of Operation>

An outline of an operation of this support device will next be described. The PSECU 10 of this support device executes a parking area detection process and a parking support control process.

The PSECU 10 executes, as the parking area detection process, a process for detecting a parking area PA to which the own vehicle SV is able to be parked based on the camera image transmitted from each of the cameras 20.

The PSECU 10 executes the following processes as the parking support control process.

(1) The PSECU 10 displays the location of the own vehicle SV (the parking completed locations 312 and 322) when the "parking to the parking area PA which has been detected through the parking area detection process" is completed on the display unit 30. In this case, when the obstacle is present in the parking area PA, the PSECU 10 extrapolates/determines an appropriate parking completed location based on the height and the location of the obstacle to display the extrapolated parking completed location on the display unit 30. The displayed extrapolated parking completed location allows/enables the driver to judge/determine whether or not the parking area is appropriate in order to start an operation for parking the own vehicle SV to that parking area PA.

(2) When "permission information representing that the driver permits the parking to the parking completed location displayed on the display unit 30" is input/generated through the operation of the parking support switch 24, the PSECU 10 performs a steering support control to perform automatic steering for parking the own vehicle SV to that parking area PA. More specifically, the steering support control includes a calculation process for calculating a target path to a target parking location (which is the permitted parking completed location) and an automatic steering process for having the own vehicle SV move along the target path.

<Parking Area Detection Process>

The parking area detection process will be next described in detail.

When the vehicle velocity Vs is equal to or lower than a threshold velocity Vs1th, the PSECU 10 determines that a detection performing condition is established. The threshold velocity Vs1th is set to a value which is higher than a typical maximum value of the vehicle velocity Vs while the driving operation for the parking is being performed. For example, the threshold velocity Vs1th is set to "16 km/h".

When the PSECU 10 determines that the detection performing condition is established, the PSECU 10 performs the following two processes (the following Processes A and B) so as to detect the parking area (space, spot) PA (where the own vehicle can be parked) based on the camera image.

Process A: The PSECU 10 detects (extracts) white lines from the camera image to detect (extract/specify) the parking area PA based on the detected white lines. This process A is referred to as a "white line parking area detection process".

Process B: The PSECU 10 detects an object from the camera image to detect (extract/specify) the parking area PA based on the detected object. For examples, the object includes other vehicle OV, a wall of a house, or the like. This process B is referred to as an "object parking area detection process".

<Detail of White Line Parking Area Detection Process and Parking Support Control>

The white line parking area detection process will next be described with reference to FIG. 4. The parking area PA to which the own SV is able to be vertically parked (i.e., parked vertical/orthogonal to a travel direction of a road) is detected as a vertical parking area(s) PAn through the white line parking area detection process. When the vertical parking areas PAn need to be distinguished from each other, each of the vertical parking areas PAn is expressed as a "PAnX (X: natural number)". When a vertical parking is completed, the own vehicle SV is aligned/positioned in parallel with the other vehicle OV in the vehicle-width direction. In other words, when the vertical parking is completed, the own vehicle SV is parked such that the front-rear direction of the own vehicle SV corresponds to a perpendicular direction to a travel direction of a traveling path (refer to a white arrow shown in FIG. 4).

More specifically, the PSECU 10 detects/extracts edge points included in the camera image (image data) to detect the white lines based on the detected/extracted edge points, by using a widely-known method. The approach for detecting the white lines based on the edge points is widely-known (for example, refer to Japanese Patent Application Laidopen No. 2013-105179).

Subsequently, the PSECU 10 extrapolates an extrapolated travel path RCR based on the vehicle velocity Vs and the yaw rate Yr. The extrapolated traveling path is a traveling path along which a center point in the vehicle-width direction of the own vehicle SV (the center point PO (refer to FIG. 2) of a wheel axis connecting a front left wheel and a front right wheel) will move. This process for extrapolating the extrapolated travel path RCR is described later in detail.

Thereafter, the PSECU 10 selects (extracts) the white line which satisfies both the following conditions 1 and 2 as a candidate line.

(Condition 1) A magnitude θ of an angle between an "extension line EL obtained through extending the detected white line to a side of the extrapolated travel path RCR" and the "extrapolated travel path RCR" falls within a range between a first threshold angle θ1th which is smaller than 90 deg and a second threshold angle θ1th which is greater than 90 deg. If the magnitude θ of the above angle falls within this range, the angle can be regarded as a substantially right angle. For examples, the first threshold angle θ1th is set to 85 deg, and the second threshold angle θ2th is set to 95 deg.

(Condition 2) A length Lw of the white line is longer than a threshold length L1th. For example, the threshold length L1th is set to "1 meter".

The PSECU 10 extracts and pairs two candidate lines which satisfy the following condition 3 to specify each of the paired two candidate lines as a section line.

(Condition 3) A "distance Ld between one candidate line (one white line which satisfies both the conditions 1 and 2) and another candidate line (hereinafter, referred to as an "adjacent candidate line") which is the closest to the one candidate line in a direction of the extrapolated travel path RCR" is equal to or longer than a first threshold distance Ld1th and is equal to or shorter than a second threshold distance Ld2th.

The first threshold distance Ld1th is set to a predetermined distance which can theoretically provide/secure a left clearance distance LL shown in FIG. 2 and a right clearance distance RL shown in the FIG. 2 in the parking area PA when the vertical parking to the parking area PA is completed. The left clearance distance LL is a predetermined clearance between a "left side surface of the own vehicle SV" and "the white line or the obstacle which is located to the left of the own vehicle SV". The right clearance distance RL is a predetermined clearance between a "right side surface of the own vehicle SV" and "the white line or the obstacle which is located to the right of the own vehicle SV. More specifically, as shown in FIG. 2, the first threshold distance Ld1th is set to a value (LRPL) equal to a sum of a left direction parking distance LPL and a right direction parking distance RPL. The left direction parking distance LPL is a value obtained by adding a half (W/2) of a vehicle-width W of the own vehicle SV to the predetermined left clearance LR. The right direction parking distance RPL is a value obtained by adding the half (W/2) of the vehicle-width W to the predetermined right clearance RL. Although the left clearance LL is the same as the right clearance RL in this example, in some embodiments, the left clearance LL and the right clearance RL are different from each other.

The second threshold distance Ld2th is set to a front-rear direction parking distance FRPL (=L+FRL) (hereinafter, may be referred to as a "first front-rear direction parking distance") obtained by adding a vehicle-length L of the own vehicle SV to a predetermined front-rear clearance FRL (hereinafter, may be referred to as a "first front-rear clearance"). The own vehicle SV is able to be parallelly parked to the parking area PA whose distance Ld is longer than the second threshold distance Ld2th. Therefore, the PSECU 10 does not regard/detect the parking area PA whose distance Ls is longer than the second threshold distance Ld2th as the vertical parking area PAn.

The PSECU 10 detects an area which is sandwiched between two section lines satisfying the above condition 3 as the vertical parking area PAn (in actuality, PAnX). A closer end to the own vehicle SV between one end and the other end of each of the two section lines which sandwich the parking area PAnX is referred to as a "front end". Therefore, a line connected with a front end of one section line and a front end of the other section line constitute/defines a front end section line of the parking area PAnX. As described above, one section line and the other section line defines the parking area PAnX. In some embodiments, a point shifted to the own vehicle by a predetermined distance (e.g., 0.3 m) from an end which is closer to the own vehicle SV between the one end and the other end of each of a pair of the section lines is defined as the "front end". A rear end of the parking area PAnX is obtained by parallelly moving the front end of the parking area PAnX to a backward direction by the front-rear direction parking distance FRPL.

The PSECU 10 stores, into the RAM 13, location information indicative of a relative location of the vertical parking area PAn in relation to a center point RPO of a wheel axis connecting a rear left wheel and a rear right wheel and time at which the PSECU 10 acquires that location information. This location includes a distance between a center point CP of the front end of the vertical parking area PAn and the center point RPO and a direction of the center point CP of the front end of the vertical parking area PAn in relation the center point RPO.

Figure 4:
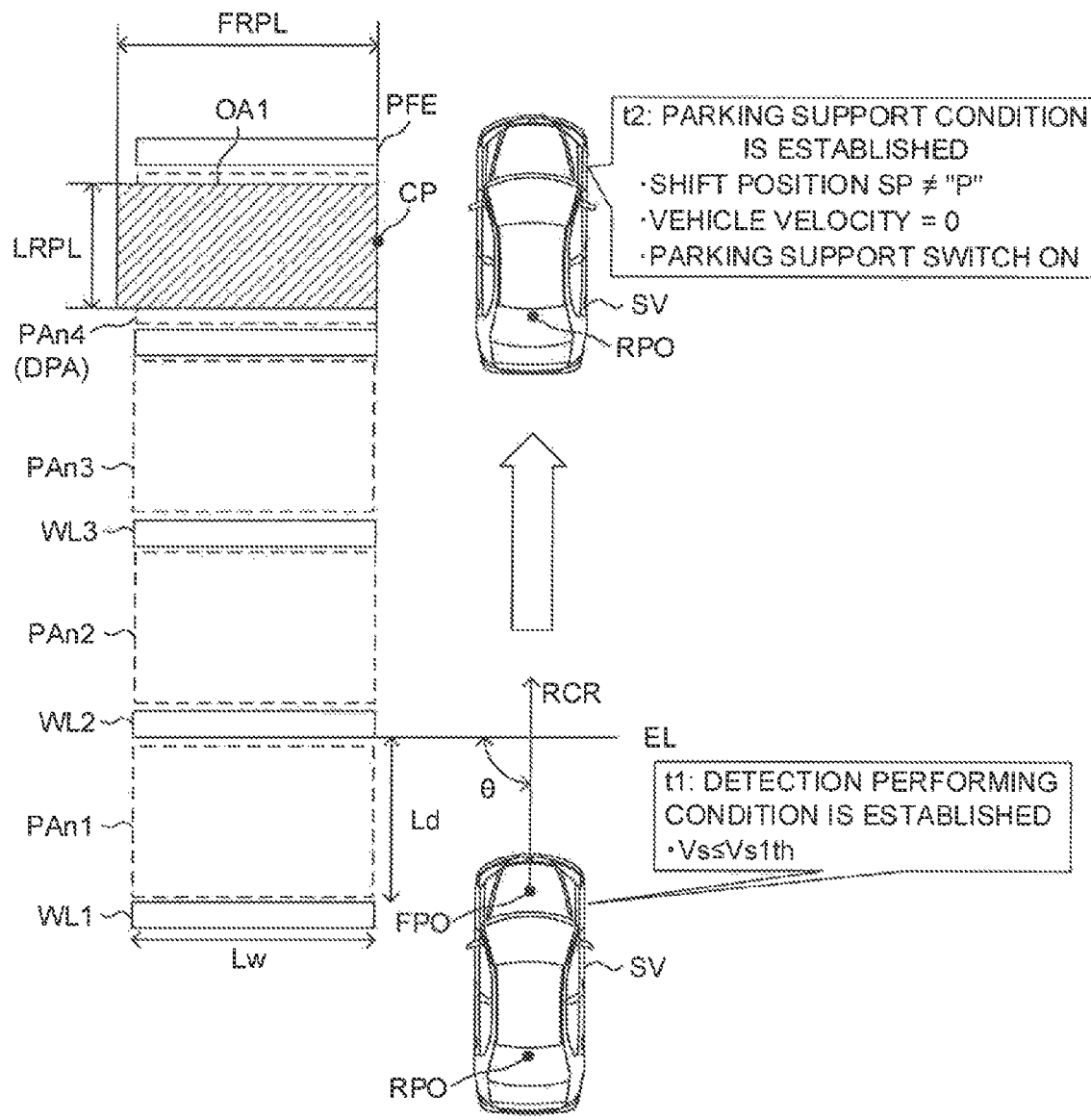
FIG. 4 is a diagram illustrating an outline of a detection process for detecting a vertical parking area.

For instance, in an example shown in FIG. 4, it is assumed that the detection performing condition is established because the vehicle velocity Vs of the own vehicle SV is equal to or lower than the threshold velocity Vs1th at a time point t1. Therefore, the PSECU 10 selects three white lines WL1 to WL3 as the candidate lines based on the camera image, and detects the vertical parking areas PAn1 and PAn2 based on the candidate lines WL1 to WL3.

While the own vehicle SV is traveling forward (for a time period from the time point t1 to a time point t2), it is assumed that the detection performing condition is always established in the example shown in FIG. 4. Therefore, the PSECU 10 detects the vertical parking areas PAn1 to PAn4.

On the other hand, the PSECU 10 determines whether or not a parking support condition is established. The parking support condition is established when all of the following three conditions are established.

The shift position SP is not the parking range "P".
The vehicle velocity Vs is "0".
The driver operates the parking support switch 24.

When the parking support condition is established, for example, at the time point t2 shown in FIG. 4, the PSECU 10 specifies the location of the parking area PA (location bof each of the vertical parking areas PAn) corresponding to the "location of the own vehicle SV at the present time point (the time point t2)", based on the location information of the parking area PAnX (X:1 to 4) stored in the RAM 13.

More specifically, the PSECU 10 converts the location of each parking area PAnX stored in the RAM 13 into a location in relation to the center point RPO at the present time point, based on a traveling path along which the own vehicle SV has traveled for a time period from a time point (a storing time) at which the location information of each parking area PAnX was stored in the RAM 13 to the present time point (the present time). As a result, the locations of the parking areas PAn1 to PAn 4 in relation to the center point RPO at the present time point shown in FIG. 4 are specified. It should be noted that the PSECU 10 stores the yaw rate Yr and the vehicle velocity Vs into the RAM 13, every time a predetermined time period elapses. The PSECU 10 calculates the traveling path in a period from the storing time to the present time based on the stored yaw rates Yr and the stored vehicle velocities Vs. The PSECU 10 acquires information on the relative location (the relative distance and the relative direction) between the center point RPO at the storing time and the location of the center point RPO at the present time to perform the above conversion based on that acquired information.

A process for displaying the parking completed location when the parking support condition becomes established will next be described using the example shown in FIG. 4. When the above parking support condition is established at the time point t2, the PSECU 10 selects the parking area PA (in this case, the parking area PA4) which is the closest to the center point RPO at the time point t2 among "the parking areas PAn1 to PAn4 which have been detected for the time period from the time point t1 to the time point t4", as the parking area (that is, the "display parking area DPA") for which the parking completed location of the own vehicle SV is displayed. It should be noted that the detection performing condition has been established for the above time period.

Subsequently, the PSECU 10 sets an "area (hereinafter, referred to as a "determination area OA1") in which the PSECU 10 determines whether or not the obstacle is present" in the selected display parking area DPA. The determination area OA1 is defined in the following manner.

The determination area OA1 has the front-rear parking distance FRPL (=L+FRL, refer to FIGS. 2 and 4, hereinafter may be referred to as a "first front-rear direction parking distance") from an area front end PFE which is the front end section line of the display parking area DPA.

The determination area OA1 has a half (=2/LRPL) of a left-right direction parking distance LRPL from a center point CP in the left-right direction of the display parking area DPA in a left direction, and the half (=2/LRPL) of the left-right direction parking distance LRPL from the center point CP in a right direction. In other words, a width in the left-right direction of the determination area OA1 is the left-right direction parking distance LRPL (=Ld1th, refer to FIGS. 2 and 4, hereinafter, may be referred to as a "first left-right direction parking distance"). The left-right direction parking distance LRPL is a value obtained by adding the vehicle-width W of the own vehicle to "the sum (hereinafter, may be referred to as a "first left-right clearance") of the left clearance LL and the right clearance RR".

In other words, the determination area OA1 is an area defined in consideration of "a clearance (a length of a space) in a left-right direction of the own vehicle SV and a clearance (a length of a space) in a front-rear direction of the own vehicle SV" which are provided when the vertical parking to the display parking area DPA is completed. The front end PFE of the determination area OA1 corresponds to (coincides with) the front end section line of the vertical parking area PAnX and the front end section line of the display parking area DPA.

Figure 5:
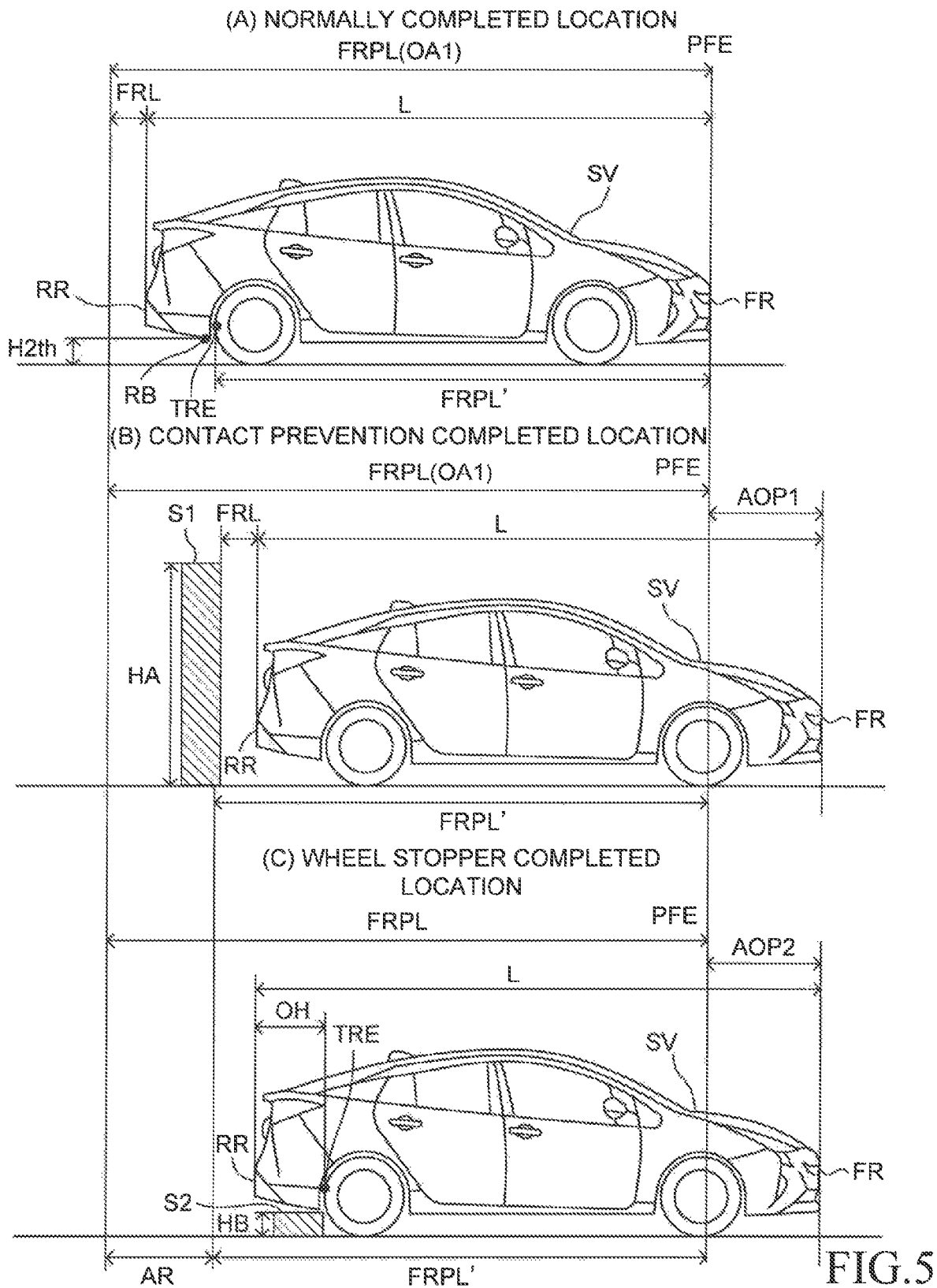
FIG. 5 is a diagram illustrating parking completed locations in the vertical parking area.

The PSECU 10 determines whether or not the obstacle (hereinafter, referred to as a "predetermined height obstacle") whose height H is equal to or higher than a threshold height H1th is present in the determination area OA1 based on the camera image. The threshold height H1th is set to a value which is smaller than a minimum ground clearance which is a distance between a bottom end RB of a vehicle-body of the own vehicle SV and the ground. As shown in FIG. 5 (A), the bottom end RB is located behind a rear end TRE of a rear wheel of the own vehicle SV in the rear direction. The minimum ground clearance is a height H2th shown in FIG. 5 (A). Thus, the height H2th is higher than the threshold height H1th (H2th>H1th). A process in the following case 1 and a process in the following case 2 will next be described.

(Case 1) No Predetermined Height Obstacle is Present in the Determination Area OA1.

In this case, the PSECU 10 extrapolates, as the parking completed location, the location of the own vehicle SV (refer to FIG. 5 (A)) when the parking is completed in such a manner that "a front end FR of the own vehicle SV corresponds to (coincides with) the area front end PFE of the vertical parking area PAn" and "the center point in the vehicle-width direction of the own vehicle SV corresponds to (coincides with) the center point CP of the front end of the vertical parking area PAn". Hereinafter, this parking completed location is referred to as a "normally completed location". The PSECU 10 displays the extrapolated normally completed location on the parking support screen 300 as the parking completed locations 312 and 322.

When the parking completed locations 312 and 322 are displayed on the parking support screen 300, the driver takes a look at (visually recognizes) the parking completed locations 312 and 322. When the driver judges that the parking completed location in the display parking area DPA is appropriate, the driver permits the parking to the display parking area DPA. In this case, the driver performs the parking support switch 24 to input the permission information to the PSECU 10. When the PSECU 10 receives the permission information, the PSECU 10 performs the parking support control (the steering support control) for parking the own vehicle SV to the parking completed location with finally moving the own vehicle SV in reverse.

On the other hand, when the driver judges that the parking completed area in the display parking area DPA is inappropriate, the driver does not permit the parking to the display completed area DPA. In this case, when the driver hopes the parking to the other parking area PAnX, the driver touches the other parking area PAnX displayed on the parking support screen 300. When the PSECU 10 detects this touch operation, the PSECU 10 sets the touched parking area PAnX to the display parking area DPA. The PSECU 10 extrapolates the parking completed location in the display parking area DPA in the manner as described above to display the extrapolated parking completed location on the parking support screen 300. Thereafter, the PSECU 10 performs the same process as the process described above.

(Case 2) the Predetermined Height Obstacle(s) is(are) Present in the Determination Area OA1.

In this case, the PSECU 10 selects, as a "potential contact obstacle", the obstacle whose height H is equal to or higher than the threshold height H2th, among the predetermined height obstacles present in the determination area OA1. As described above, the threshold height H2th is set to the minimum ground clearance of the vehicle-body, and the threshold height H2th is higher than the threshold height H1th.

Subsequently, the PSECU 10 selects, as a "contact obstacle S1", the obstacle which is located at the nearest point to the front end of the determination area OA1, in other words, the obstacle which is the nearest to the own vehicle SV among the potential contact obstacles. When only one potential contact obstacle is present in the determination area OA1, the PSECU 10 selects the potential contact obstacle as the contact obstacle S1.

As described in FIG. 5(B), the PSECU 10 extrapolates, as a "contact prevention completed location", the location of the own vehicle SV when the parking is completed in such a manner that a rear end RR of the own vehicle SV corresponds to (coincides with) a location away from a front end of the contact obstacle S1 by the front-rear clearance FRL in the front direction of the display parking area DPA. The front end of the contact obstacle S1 is an end which is located in the front direction side of the display parking area DPA. The contact obstacle S1 is the obstacle whose height HA is equal to or higher than the threshold height H2th, as shown in FIG. 5(B). For example, the contact obstacle S1 is a utility/telegraph pole, a fence, a pole for a construction site, a standing signboard, a bicycle, or the like.

In the case where the contact obstacle S1 is present in the determination area OA1, the own vehicle SV contacts with the contact obstacle S1 or the own vehicle SV approaches the contact obstacle S1 excessively when the parking is completed in such a manner that the front end FR of the own vehicle SV corresponds to (coincides with) the area front end PFE of the display parking area DPA (refer to FIG. 5(A)). In view of this, as shown in FIG. 5(B), the parking is required to be completed in such a manner that the own vehicle SV stops at a location ahead of the contact obstacle S1 in order to prevent the own vehicle SV from contacting with the contact obstacle S1. Accordingly, the PSECU 10 extrapolates the contact prevention completed location in the manner as described above.

In other words, this contact prevention completed location shown in FIG. 5(B) is a location obtained by moving the normally completed location shown in FIG. 5(A) to a location where the rear end RR of the own vehicle SV is located at a location away from the front end of the contact obstacle S1 by the front-end clearance FRL toward the front direction of the display parking area DPA. As shown in FIG. 5(B), when the own vehicle SV is located at the contact prevention completed location, the front end FR of the own vehicle SV protrudes from the area front end line section PFE by a "certain protrusion amount AOP1".

The PSECU 10 selects, as a "potential wheel stopper", the predetermined height obstacle other than the "potential contact obstacle". In other words, the potential wheel stopper is the predetermined height obstacle whose height H is equal to or higher than the threshold height H1th and is lower than the threshold height H2th, among the predetermined obstacles in the determination area OA1.

Subsequently, the PSECU 10 selects, as a "wheel stopper S2", the obstacle which is the nearest to the front end of the determination area OA1 (in other words, the obstacle which is the nearest to the own vehicle SV), among the potential wheel stoppers. When only one potential wheel stopper is present in the determination area OA1, the PSECU 10 selects the potential wheel stopper as the wheel stopper S2.

Next, as shown in FIG. 5(C), the PSECU 10 extrapolates, as a "wheel stopper completed location", the location of the own vehicle SV when the parking is completed in such a manner that the rear end RR of the own vehicle SV corresponds to (coincides with) a location away from a front end of the wheel stopper S2 by a predetermined distance OH in the rear direction of the display parking area DPA. The front end of the wheel stopper S2 is an end which is located in the front direction side of the display parking area DPA. The predetermined distance OH is set to a distance between the rear end of the rear wheel of the own vehicle SV and the rear end RR of the own vehicle SV.

Generally, the wheel stopper is installed in the parking area PAn in order to prevent the wheel (in this example, the rear wheel because the own vehicle SV is driven in reverse before the parking is completed) of the vehicle from moving behind the wheel stopper. Therefore, "the own vehicle SV at a time point at which the parking is completed" is not located behind a location of the own vehicle SV when the rear end TRE of the rear wheel of the own vehicle SV contacts with a front end of the wheel stopper. In view of this, the PSECU 10 extrapolates the wheel stopper completed location in the manner as described above.

In other words, the wheel stopper location shown in FIG. 5(C) is the location of the one vehicle SV when the vertical parking is completed in such a manner that the rear end TRE of the rear wheel of the own vehicle SV (firstly) contacts with the front end of the wheel stopper S2. As shown in FIG. 5(C), when the own vehicle SV is located at the wheel stopper completed location, the front end FR of the own vehicle SV protrudes from the area front end PFE by a "certain protrusion amount AOP2".

In the case where the wheel stopper S2 is present in an area AR (refer to FIG. 5(C)) included in the determination area OA1, the front end FR of the own vehicle SV does not protrude from the front end RFE when the parking is completed in such a manner that the own vehicle SV stops at the wheel stopper completed location. The area AR is an area between "a first line segment which is away from the area front end PFE by a predetermined distance FRPL' (refer to FIGS. 5(A) to 5(C))" and "a second line segment which is away from the area front end PFE by the front-rear direction parking distance FRPL". As shown in FIG. 5(A), the predetermined distance FRPL' is a distance from the front end FR of the own vehicle SV to the rear end TRE of the rear wheel. Therefore, when the wheel stopper is present in the area AR, the PSECU 10 extrapolates the wheel stopper completed location as the same location as the normally completed location. In other words, in the case where the front end FR does not protrude from the front end RFE when the parking is completed in such a manner that the own vehicle SV stops at the wheel stopper completed location, the PSECU 10 extrapolates the wheel stopper completed location as the same location as the normally completed location.

When the PSECU 10 extrapolates both of the contact prevention completed location and the wheel stopper completed location, the PSECU 10 selects, as the parking completed location, the most frontward location (the location at which protrusion amount (AOP1, AOP2) of the front end FR of the own vehicle SV from the front end RFE is the longest) between the contact prevention completed location and the wheel stopper completed location. Thereafter, the PSECU 10 displays the selected location on the parking support screen 300 as the parking completed locations 312 and 322. The operation of the PSECU 10 thereafter is the same as the operation of the PSECU 10 after the PSECU 10 has displayed the normally completed location on the parking support screen 300 as the parking completed locations 312 and 322.

As understood from the above, when the vertical parking to "the display parking area DPA which is associated with the determination are OA1 in which both the potential contact obstacle and the potential wheel stopper are present" is performed, the PSECU 10 extrapolates both the contact prevention completed location and the wheel stopper completed location. Thereafter, the PSECU 10 displays one completed location which is the most frontward location between the contact prevention completed location and the wheel stopper completed location on the parking support screen 300.

When the vertical parking to "the display parking area DPA which is associated with the determination are OA1 in which no potential contact obstacle is present but the potential wheel stopper is present" is performed, the PSECU 10 extrapolates the wheel stopper completed location. Thereafter, the PSECU 10 displays the wheel stopper completed location on the parking support screen 300 in the case where the front end FR of the own vehicle SV protrudes from the front area PFE when the vertical parking is completed in such a manner that the own vehicle SV stops at the wheel stopper completed location.

When the vertical parking to "the display parking area DPA which is associated with the determination are OA1 in which no potential wheel stopper is present but the potential contact obstacle is present" is performed, the PSECU 10 extrapolates the contact prevention completed location. Thereafter, the PSECU 10 displays the contact prevention completed location on the parking support screen 300.

Accordingly, even if the obstacle is present in the display parking area DPA, the driver can recognize/see the accurate/ exact parking completed location before the vertical parking starts to be actually performed. As a result, the driver can judge whether or not the parking completed location in the display parking area DPA is appropriate before an actual parking operation (or the parking support control) is performed.

<A Detail of the Object Parking Area Detection Process and the Parking Support Control>

The object parking area detection process will next be described with reference to FIG. 6. Through the object parking area detection process, the vertical parking area PAn and the parallel parking area PAp are detected. When the parallel parking is completed, the own vehicle SV is aligned in parallel with the other vehicle OV in the front-end direction. In other words, when the parallel parking is completed, the own vehicle SV stops in such a manner that the front-rear direction of the own vehicle SV coincide with a direction which is parallel with the travel direction of the traveling path (refer to a white arrow shown in FIG. 6).

More specifically, the PSECU 10 extracts a stationary object(s) (i.e., an object which is not moving) from the camera image. In more detail, the PSECU 10 divides the camera image into a plurality of local areas, each of the local areas having a predetermined size, and calculates an image feature amount for each of the divided local areas. An image feature amount of each object type is stored in the PSECU 10 (i.e., the ROM 12) in advance. For example, the object types include a vehicle, a curbstone, a guardrail, a building, a roadside tree, and the like. Thereafter, the PSECU 10 compares the calculated image feature amount with the stored image feature amount so as to extract one or more local areas corresponding to (representing) a part of the object or a whole of the object.

The PSECU 10 identifies/specifies, from the camera image which has been photographed at a time point earlier than the present time point by a predetermined time or more, an object which is the same as the object extracted from the camera image at the present time point. Thereafter, the PSECU 10 calculates a relative velocity of the object in relation to the own vehicle SV based on a time series transition of locations of the object. The PSECU 10 calculates a velocity of the object based on the calculated relative velocity of the object and the vehicle velocity Vs of the own vehicle SV, to extract the object having the calculated velocity equal to "0 m/s" as the stationary object.

The PSECU 10 extracts edge points of the extracted stationary object to select, as a pseudo white line, a group of edge points which are aligned on a straight line among the extracted edge points. Thereafter, the PSECU 10 detects the vertical parking area in the same manner as the white line parking area detection process described above. More specifically, the PSECU 10 selects, as the candidate line, the pseudo white line which satisfies both of the conditions 1 and 2. The PSECU 10 extracts and pairs two candidate lines which satisfy the above condition 3 to select each of the paired two candidate lines as a section line. The PSECU 10 detects, as the vertical parking area, an area which is sandwiched by the two section lines, and stores "the location information representing the relative location of the detected vertical parking area PAn with respect to the center point RPO of the own vehicle SV" together with the time into the RAM 13. The above process is the same as the white line parking area detection process.

The PSECU 10 also detects the parallel parking area Pap through the object parking area detection process. More specifically, the PSECU 10 selects, as the section line, each of the two candidate lines which satisfy the following condition 4.

(Condition 4) "A distance Ld between one candidate line (one pseudo white line which satisfies both of the conditions 1 and 2) and another candidate line (hereinafter, referred to as an "adjacent candidate line") which is the closest to the one candidate line in a direction of the extrapolated travel path RCR" is equal to or longer than a third threshold distance Ld3th and is equal to or shorter than a fourth threshold distance Ld4th.

The third threshold distance Ld3th is set to a value (=L+FFL+FRL) obtained by adding the vehicle-length L of the own vehicle SV to an added value obtained by adding a front clearance FFL (refer to FIG. 6) to the front-rear clearance FRL. The fourth threshold distance Ld4th is set to a value which is greater than the third threshold distance Ld3th. In this example, the front clearance FFL, the above front-rear clearance FRL, the left clearance LL, and the right clearance RL are set to the same value as each other. In some embodiments, these clearances are set to different values from each other.

The PSECU 10 detects, as the parallel parking area PAp, the area which is sandwiched by the two section lines which satisfy the above condition 4. Thereafter, the PSECU 10 stores the location information representing the relative location of the detected parallel parking area PAp in relation to the center point RPO of the own vehicle SV together with the time at which the location information is obtained in the RAM 13. The location information includes the distance between the center point CP (refer to FIG. 6) of the front end of the parallel parking area PAp and the center point RPO, and the direction of the center point CP of the front end of the parallel parking area PAp in relation to the center point RPO of the own vehicle SV.

A closer end to the own vehicle SV between one end and the other end of each of the two section lines which sandwich the parking area PAp is referred to as a front end. Therefore, a line connected with one front end of one section line and the other front end of the other section line is a front end of the parking area PAp. In some embodiments, a point closer to the own vehicle SV by a predetermined distance (for example, 0.3 m) from the closer end is set to the front end of the parking area PAp. A rear end of the parking area PAp is obtained by parallelly moving the front end of the parking area PAp in the backward direction by an entering direction parking distance APL (described later).

Figure 6:
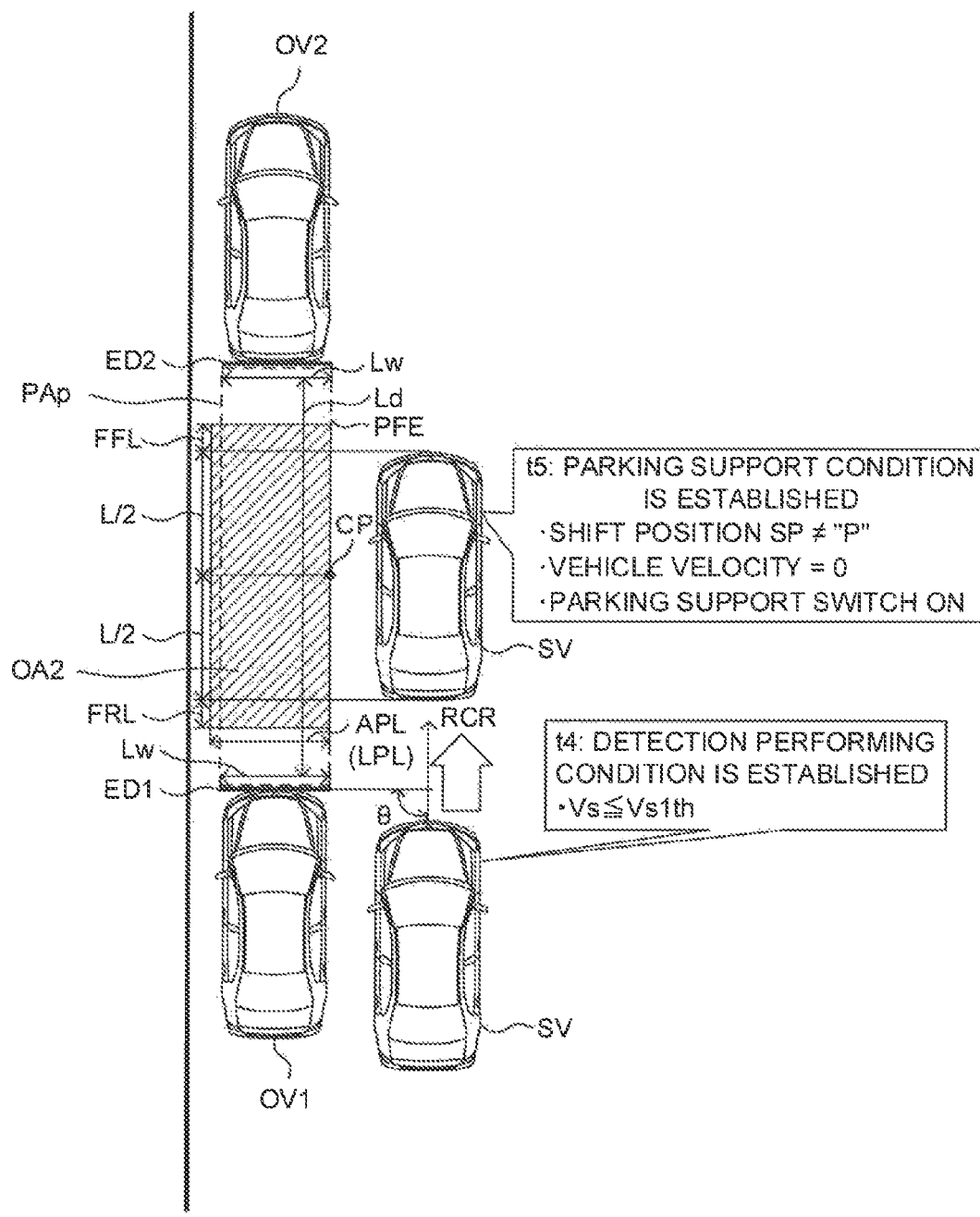
FIG. 6 is a diagram illustrating an outline of a detection process for detecting a parallel parking area.

For example, in the example shown in FIG. 6, the above detection performing condition (Vs Vs1th) is established at time point t4. Therefore, at time point t4, the PSECU 10 detects "stopped other vehicles OV1 and OV2" based the camera image to specify the pseudo white line which is formed by a group of edges ED1 of the other vehicle OV1 and the pseudo white line which is formed by a group of edges ED2 of the other vehicle OV2. The PSECU 10 detects the parallel parking area PAp based on these pseudo white lines.

In the example shown in FIG. 6, the above parking support condition at time point t5 is established. Therefore, the PSECU 10 selects the parallel parking area PAp as the display parking area DPA to set the determination area OA2 in the selected display parking area DPA. The closest end to the display parking area DPA between the left end and the right end of the own vehicle SV is referred to as an "entrance end", because the own vehicle SV enters the display parking area DPA from this closest end (that is, this closest end firstly enters the display parking area DPA). The opposite end to the entrance end is referred to an "opposite entrance end".

The determination area OA2 is defined in the following manner, as shown in FIG. 6.

The determination area OA2 has a predetermined entering direction parking distance APL (hereinafter, may be referred to as a "second left-right direction parking distance") from an area front end PFE in the rear direction. In the example shown in FIG. 6, the area front end PFE is one of the ends of the parallel parking area PAp closer to the left side of the own vehicle SV. The rear direction is a direction in which a distance from the own vehicle SV becomes larger. The entering direction parking distance APL is a value obtained by adding the vehicle-width W to "a distance (hereinafter, may be referred to as a second left-right clearance), which is equal to either the left clearance LL or the right clearance RR". The second left-right clearance is equal to the left clearance LL when the entrance end is the left end of the own vehicle SV. The second left-right clearance is equal to the right clearance LL when the entrance end is the right end of the own vehicle SV.

The determination area OA2 has "a distance (=L/2+FFL) obtained by adding the front clearance FFL (refer to FIG. 6) to a half (L/2) of the vehicle-length L of the own vehicle SV" from "the center point CP in the left-right direction of the display parking area DPA" in the left direction, and has "a distance (=L/2+FRL) obtained by adding the front-rear clearance FRL to the half (L/2) of the vehicle-length L of the own vehicle SV" from the center point CP of the display parking area DPA in the right direction". The length of the determination area OA2 in the left-right direction is a distance (hereinafter, may be referred to as a "second front-rear direction parking distance") obtained by adding a second front-rear clearance to the vehicle-length L of the own vehicle SV. The second front-rear clearance is a distance obtained by adding the front clearance FFL to the front-rear clearance FRL.

When no obstacle (predetermined height obstacle) having a height H equal to or greater than the threshold height H1th is present in the determination area OA2, the PSECU 10 extrapolates, as the normally completed location, the location of the own vehicle SV when the parking is completed in such a manner that the opposite entrance end (the right side of the own vehicle SV in the example shown in FIG. 6) of the own vehicle SV coincides with the area front end PFE, and the center point in the front-rear direction of the own vehicle SV coincides with the center point CP in the left-right direction of the display parking area DPA. This support device displays the extrapolated normally completed location on the parking support screen 300 as the parking completed locations 312 and 322.

On the other hand, when the predetermined height obstacles are present in the determination area OA2, the PSECU 10 selects, as a "parking deterring obstacle S3", one of the predetermined height obstacles which is the closest to the front end of the determination area OA2 (the nearest to the own vehicle SV) among the predetermined height obstacles. When only one predetermined height obstacle is present in the determination area OA2, the PSECU 10 selects, as the parking deterring obstacle S3, the predetermined height obstacle.

Figure 7:
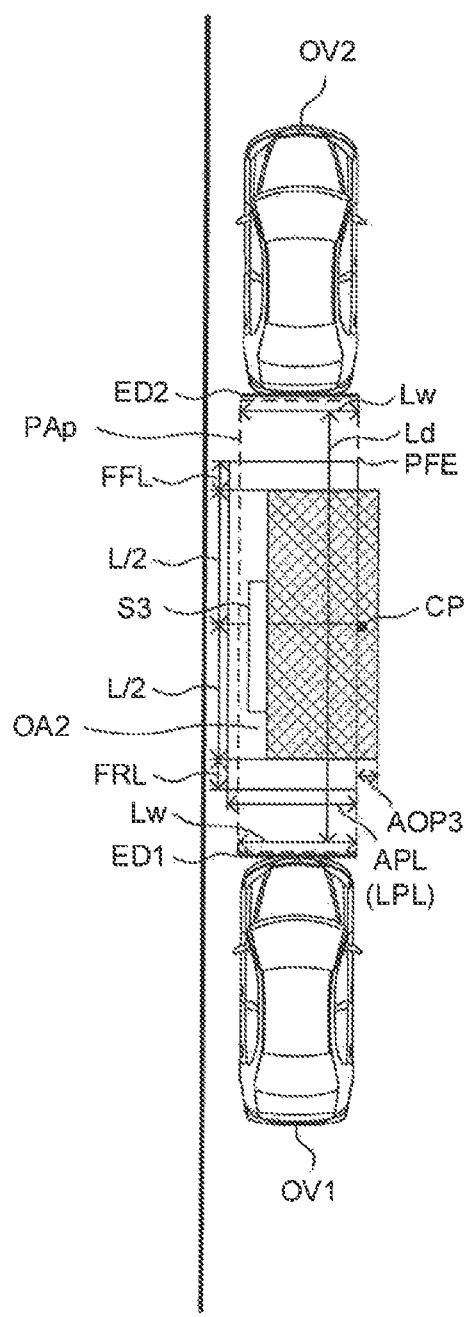
FIG. 7 is a diagram illustrating a parking completed location when an obstacle is present in the parallel parking area.

Subsequently, as shown in FIG. 7, the PSECU 10 extrapolates, as the contact prevention completed location, the location (refer to a hatching area shown in FIG. 7) of the own vehicle SV when the parking is completed in such a manner that the entrance end of the own vehicle SV coincides with "a location away from the parking deterring obstacle S3 by a predetermined specific clearance in the front direction of the display parking area DPA". This predetermined specific clearance is set to the second left-right clearance when a height of the parking deterring obstacle S3 is equal to or greater than the threshold height H2th. That is, the predetermined specific clearance is equal to the left clearance LL when the entrance end is the left end of the own vehicle SV. The predetermined specific clearance is equal to the right clearance LL when the entrance end is the right end of the own vehicle SV. For example, in the example shown in FIG. 7, the entrance end is the left side of the own vehicle SV. Therefore, the PSECU 10 extrapolates, as the contact prevention completed location, the location of the own vehicle SV when the parking is completed in such a manner that the entrance end coincides with "the location away from the parking deterring obstacle S3 by the left clearance LL in the front direction of the display parking area DPA". When the own vehicle SV is parked at the contact prevention completed location shown in FIG. 7, the right end of the own vehicle SV protrudes from the area front end PFE of the display parking area DPA by a protrusion amount AOP3. On the other hand, when a height of the parking deterring obstacle S3 is smaller than the second threshold height H2th, the specific distance is set to either the second left-right clearance or a distance (including "0") which is smaller than the second left-right clearance. The PSECU 10 displays the contact prevention completed location on the parking support screen 300 as the parking completed locations 312 and 322.

As understood from the above, when the own vehicle SV performs the parallel parking to the display parking area DPA including/encompassing the determination area OA2 in which the predetermined height obstacle is present, this support device extrapolates the contact prevention completed location in consideration of (or reflection) the location of the predetermined height obstacle, and displays the contact prevention completed location on the parking support screen 300. Therefore, the driver can find/recognize the exact/accurate parking completed location before the parallel parking is actually performed. As a result, the driver can judge whether or not the parking completed location of the display parking area DPA is appropriate before the actual parking operation (or the parking support control) is performed.

<Specific Operation>

Figure 8:
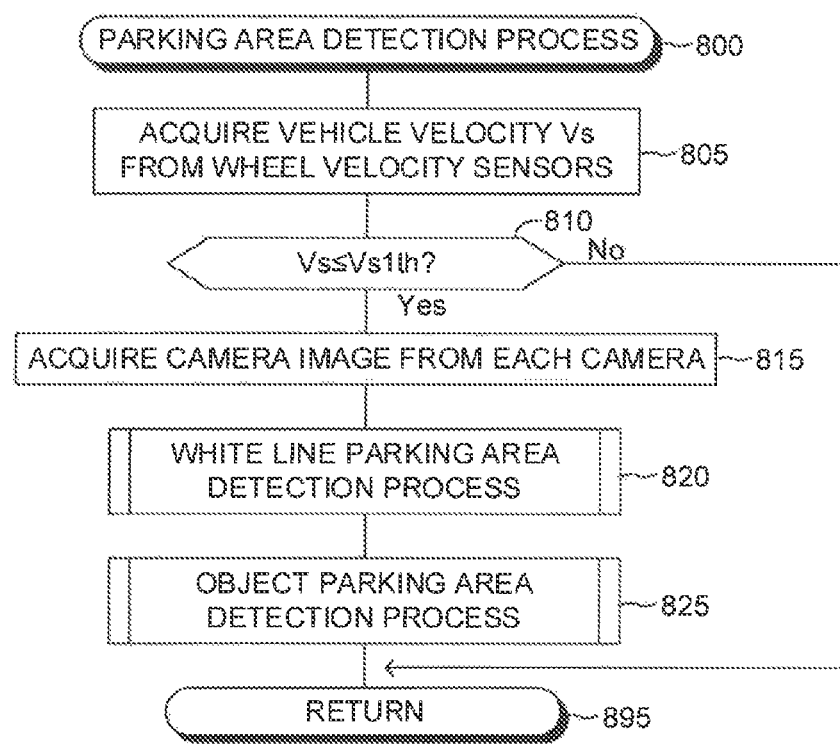
FIG. 8 is a flowchart illustrating a routine which a CPU of a parking support ECU shown in FIG. 1 executes.

The CPU 11 of the PSECU 10 executes a routine represented by a flowchart shown in FIG. 8, every time a predetermined time period elapses. The routine shown in FIG. 8 is a routine for detecting the parking area PA from the camera images acquired by each of the cameras 20.

When a predetermined timing has come, the CPU 11 starts the process from Step 800 shown in FIG. 8, and proceeds to Step 805 to acquire the vehicle velocity Vs using the wheel velocity sensors 21. Subsequently, the CPU 11 proceeds to Step 810 to determine whether or not the acquired vehicle velocity Vs is equal to or lower than the threshold velocity Vs1th.

When the vehicle velocity Vs is higher than the threshold velocity Vs1th, the detection performing condition is not established. In this case, the CPU 11 makes a "No" determination at Step 810, and proceeds to Step 895 to tentatively terminate the present routine. As a result, no parking area PA is detected. On the other hand, when the vehicle velocity Vs is equal to or lower than the threshold velocity Vs1th, the detection performing condition is established. In this case, the CPU 11 makes a "Yes" determination at Step 810 to sequentially execute processes of Step 815 through Step 825. Thereafter, the CPU 11 proceeds to Step 895 to tentatively terminate the present routine.

Step 815: The CPU 11 acquires the camera image from each of the cameras 20.

Step 820: The CPU 11 detects the white lines from the camera image acquired at Step 815, and executes the white line parking area detection process for detecting the vertical parking area PAn based on the detected white lines. In actuality, when the CPU 11 proceeds to Step 820, the CPU 11 executes a subroutine represented by a flowchart shown in FIG. 9.

Figure 9:
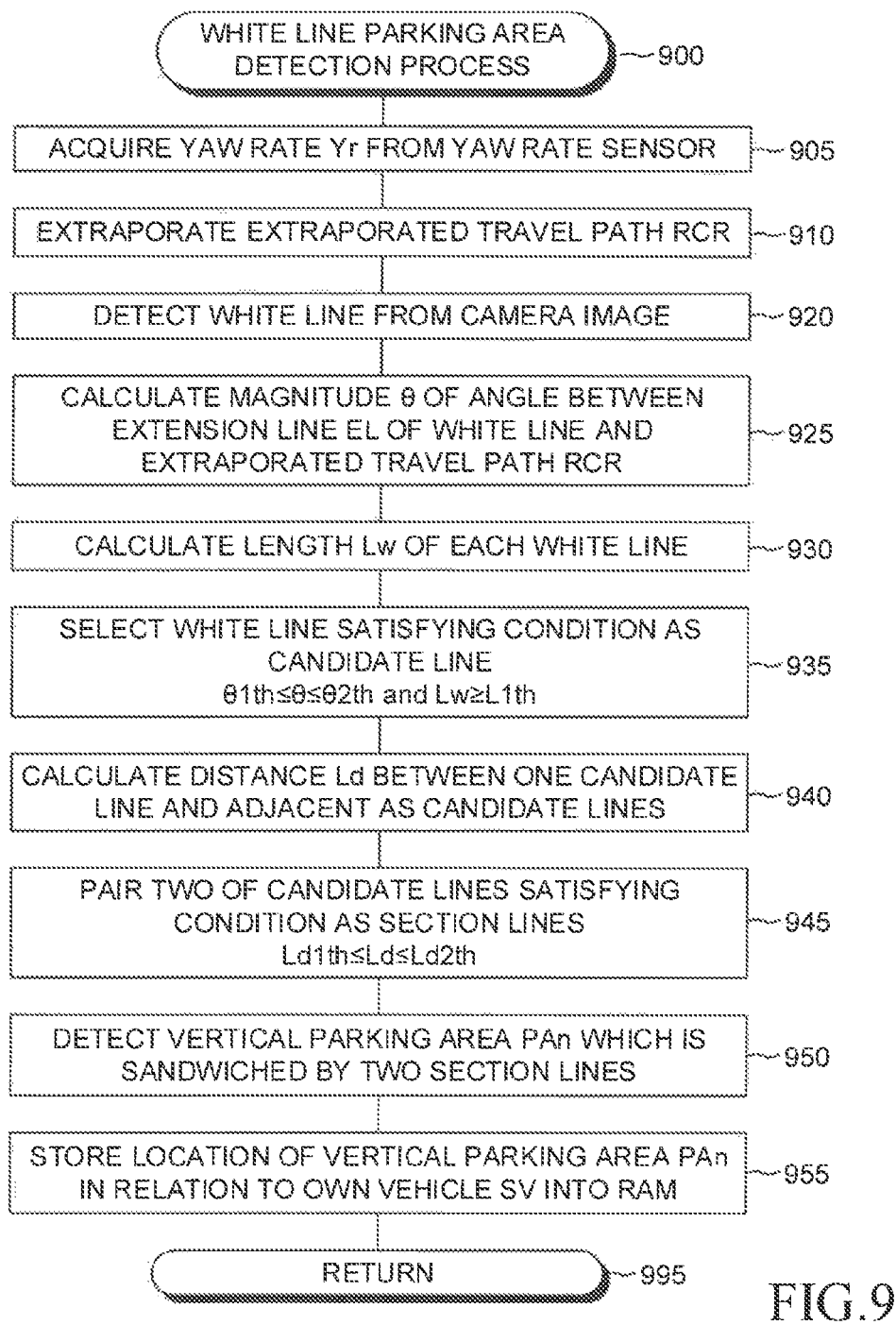
FIG. 9 is a flowchart illustrating a routine which the CPU of the parking support ECU executes in a white line parking area detection process included in the routine shown in FIG. 8.

Specifically, when the CPU 11 proceeds to Step 820, the CPU 11 starts the process from Step 900 shown in FIG. 9 to sequentially execute processes of Step 905 through Step 955. Thereafter, the CPU 11 proceeds to Step 995 to tentatively terminate the present routine.

Step 905: The CPU 11 acquires the yaw rate Yr from the yaw rate sensor 26.

Step 910: The CPU 11 calculates the turning radius of the own vehicle SV based on the vehicle velocity Vs acquired at Step 805 and the yaw rate Yr acquired at Step 905 to extrapolate the extrapolated travel path RCR based on the turning radius. When the yaw rate Yr is generated, the CPU 11 extrapolates an arc travel path as the extrapolated travel path RCR. When the yaw rate is not generated, in other words, when the yaw rate is "0", the CPU 11 extrapolate a straight travel path along a direction of an acceleration generated in the own vehicle SV, which is detected by an acceleration sensor (not shown), as the extrapolated travel path RCR.

Step 920: The CPU 11 extracts the edge points from the camera image acquired at Step 815, and detects the white lines based on the extracted edge points.

Step 925: The CPU 11 calculates the magnitude θ of the angle between the extension line EL of the white line detected at Step 920 and the extrapolated travel path RCR. The extension line EL is a line obtained through extending the white line toward the extrapolated travel path RCR.

Step 930: The CPU 11 calculates the length Lw of each of the white lines detected at Step 920.

Step 935: The CPU 11 selects, as the candidate line, the white line having the magnitude θ of the angle calculated at Step 925 which falls within the range between the first threshold angle θ1th and the second threshold angle θ2th and having the length Lw which is calculated at Step 930 and is equal to or longer than the threshold length L1th. In other words, the CPU 11 selects, as the candidate line, the white line which satisfies the above conditions (1) and (2).

Step 940: The CPU 11 selects one of the arbitrary candidate line among the candidate lines selected at Step 935, and further selects, as the adjacent candidate line, one of the candidate lines which is the closest to that arbitrary candidate line in the direction of the extrapolated travel path RCR from the candidate lines selected at Step 935. The CPU 11 calculates the distance Ld between the one candidate line and the adjacent candidate line.

Step 945: The CPU 11 pairs, as the section lines, two of the candidate lines that are apart from each other by the distance Ld which is equal to or longer than the first threshold distance LD1th (the left-right direction parking distance LRPL) and is equal to or shorter than the second threshold distance LD2th (the front-rear direction parking distance FRPL).

Step 950: The CPU 11 detects/determines, as the vertical parking area PAn, the area which is sandwiched by the two section lines paired at Step 945.

Step 955: The CPU 11 stores "the location information which includes the direction of the center point CP of the front end of the vertical parking area PAn detected at Step 950 in relation to the center point RPO of the own vehicle SV and the distance between the center point CP and the center point RPO" and the present time into the RAM 13.

It should be noted that the CPU 11 executes the processes after Step 925 for all white lines detected at Step 920. As a result, one or more of the vertical parking areas PAn is/are detected or none of the vertical parking area PAn is detected.

After executing the process at Step 955, the CPU 11 proceeds to Step 995 to tentatively terminate the present routine, and proceeds to Step 825 shown in FIG. 8. At Step 825, the CPU 11 detects the stationary object from the camera image, and executes the object parking area detection process for detecting the vertical parking area PAn and the parallel parking area PAp based on the detected object. Thereafter, the CPU 11 proceeds to Step 895 to tentatively terminate the present routine. In actuality, when the CPU 11 proceeds to Step 825, the CPU 11 executes a subroutine represented by a flowchart shown in FIG. 10.

Figure 10:
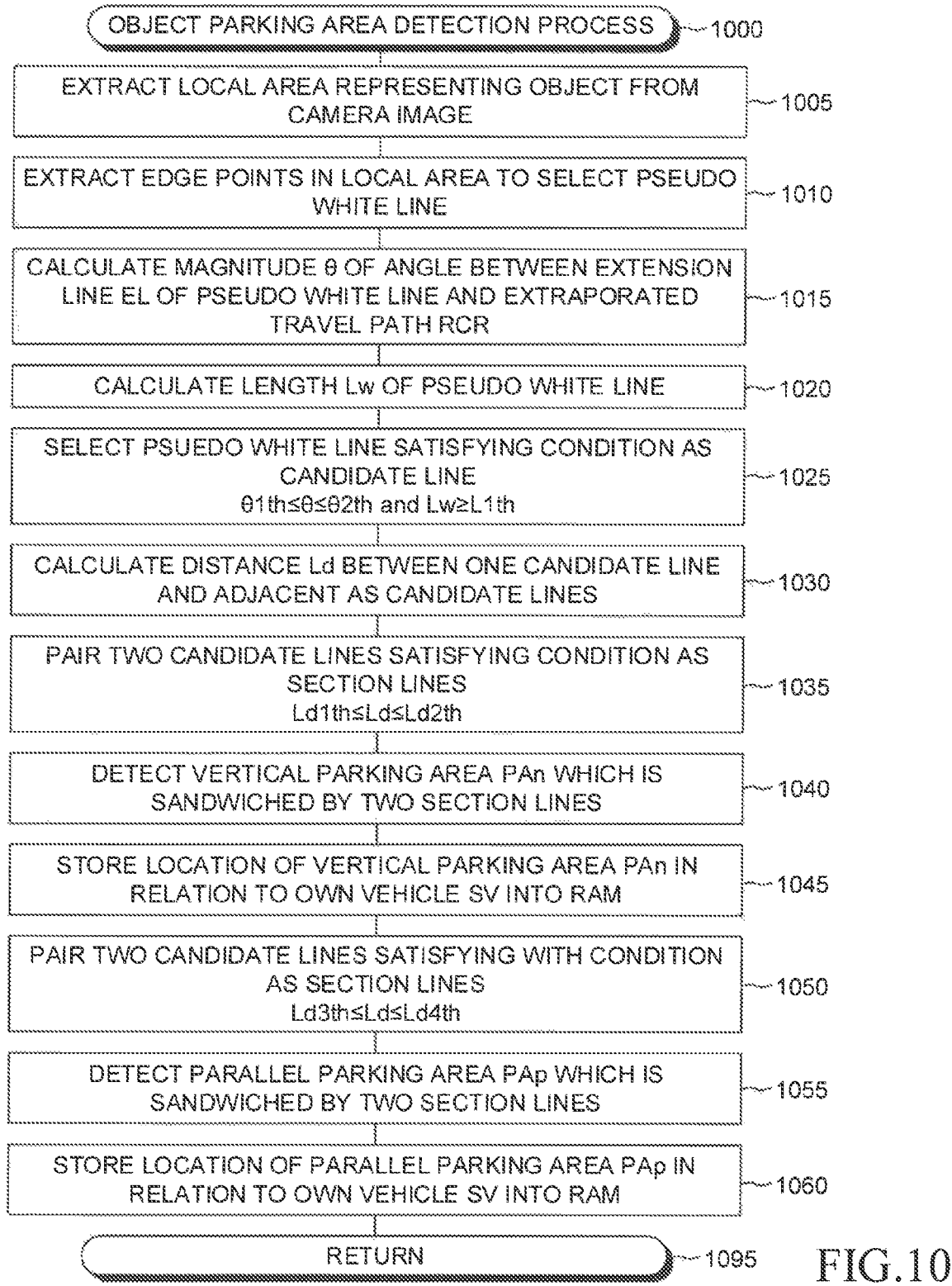
FIG. 10 is a flowchart illustrating a routine which the CPU of the parking support ECU executes in an object parking area detection process included in the routine shown in FIG. 8.

Specifically, when the CPU 11 proceeds to Step 825, the CPU 11 starts the process from Step 1000 shown in FIG. 10 to sequentially execute processes of Step 1005 through Step 1060. Thereafter, the CPU 11 proceeds to Step 1095 to tentatively terminate the present routine.

Step 1005: The CPU 11 divides the camera image into the local areas, and compares the image feature amount of each of the local areas with the image feature amount of the object stored in the ROM 12 in advance to extract one or more of the local areas representing a part of the object or the whole of the object.

Step 1010: The CPU 11 extracts the edge points in the local area extracted at Step 1005, and selects, as the pseudo white line, the group of the edge points which are aligned on the straight line among the extracted edge points.

Step 1015: The CPU 11 calculates the magnitude θ of the angle between "the extension line EL of the pseudo white line selected at Step 1010" and "the extrapolated travel path RCR". The extension line EL is a line obtained through extending the pseudo white line toward the extrapolated travel path RCR.

Step 1020: The CPU 11 calculates the length Lw of each of the pseudo white lines selected at Step 1010.

Step 1025: The CPU 11 selects, as the candidate line, the pseudo white line having the magnitude θ of the angle calculated at Step 1015 which falls within the range between the first threshold angle θ1th and the second threshold angle θ2th and having the length Lw which is calculated at Step 1020 and is equal to or longer than the threshold length L1th. In other words, the CPU 11 selects, as the candidate line, the pseudo white line which satisfies the above conditions (1) and (2).

Step 1030: The CPU 11 selects one of the arbitrary candidate line among the candidate lines selected at Step 1025, and further selects, as the adjacent candidate line, one of the candidate lines which is the closest to that arbitrary candidate line in the direction of the extrapolated travel path RCR from the candidate lines selected at Step 1025. The CPU 11 calculates the distance Ld between the one candidate line and the adjacent candidate line.

Step 1035: The CPU 11 pairs, as the section lines, two of the candidate lines that are apart from each other by the distance Ld which is equal to or longer than the first threshold distance LD1th and is equal to or shorter than the second threshold distance LD2th.

Step 1040: The CPU 11 detects, as the vertical parking area PAn, the area which is sandwiched by the two section lines paired at Step 1035.

Step 1045: The CPU 11 stores "the location information which includes the direction of the center point CP of the front end of the vertical parking area PAn detected at Step 1040 in relation to the center point RPO of the own vehicle SV and the distance between the center point CP and the center point RPO" and the present time into the RAM 13.

Step 1050: The CPU 11 pairs, as the section lines, two of the candidate lines that are apart from each other by the distance Ld which is equal to or longer than the third threshold distance LD3th and is equal to or shorter than the fourth threshold distance LD4th.

Step 1055: The CPU 11 detects, as the parallel parking area PAp, the area which is sandwiched by the two section lines paired at Step 1050.

Step 1060: The CPU 11 stores "the location information which includes the direction of the center point CP of the front end of the parallel parking area PAp detected at Step 1055 in relation to the center point RPO of the own vehicle SV and the distance between the center point CP and the center point RPO" and the present time into the RAM 13.

It should be noted that the CPU 11 executes the processes after Step 1015 for all white lines detected at Step 1010. As a result, one or more of the vertical parking areas PAn is/are detected or none of the vertical parking area PAn is detected. Similarly, one or more of the parallel parking areas PAp is/are detected or none of the parallel parking area PAp is detected.

After executing the process at Step 1060, the CPU 11 proceeds to Step 1095 to tentatively terminate the present routine, and proceeds to Step 895 shown in FIG. 8 to tentatively terminate the routine shown in FIG. 8.

Figure 11:
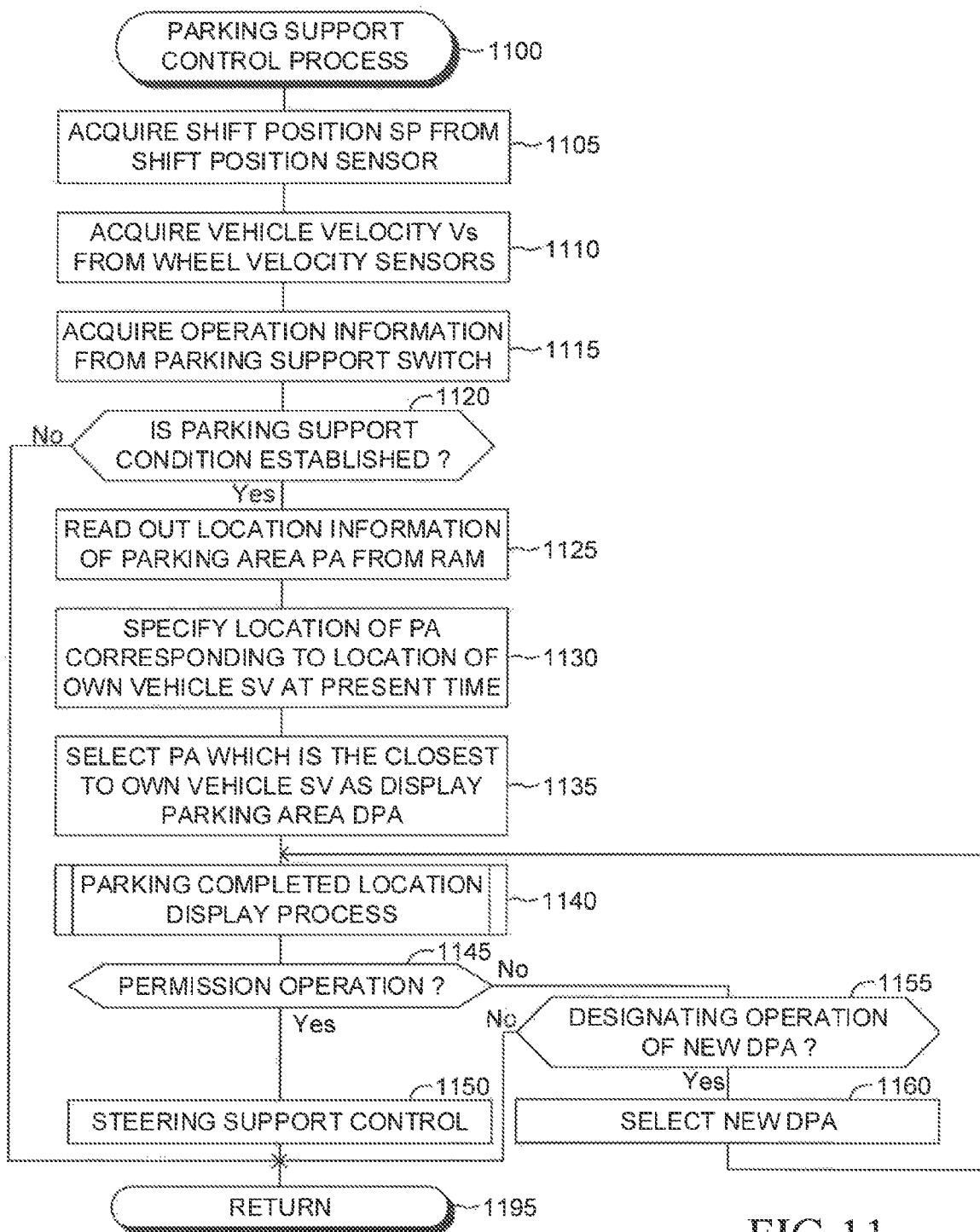
FIG. 11 is a flowchart illustrating a routine which the CPU of the parking support ECU shown in FIG. 1 executes.

The CPU 11 of the PSECU 10 executes a routine represented by a flowchart shown in FIG. 11, every time a predetermined time period elapses. The routine shown in FIG. 11 is a routine for displaying the parking completed location representing the location of the own vehicle SV when the parking to the parking area (the vertical parking area PAn or the parallel parking area PAp) detected in the routine shown in FIG. 8 is completed, and for performing the steering support control.

When a predetermined timing has come, the CPU 11 starts the process from Step 1100 shown in FIG. 11, and sequentially execute processes of Step 1105 through Step 1115. Thereafter, the CPU 11 proceeds to Step 1120.

Step 1105: The CPU 11 acquires the shift position SP from the shift position sensor 22. Step 1110: The CPU 11 acquires the vehicle velocity Vs using the wheel velocity sensors 21.

Step 1115: The CPU 11 acquires the operation information from the parking support switch 24.

Step 1120: The CPU 11 determines whether or not the parking support condition is established. More specifically, when all of the following conditions are established, the CPU 11 determines that the parking support condition is established.

The shift position SP acquired at Step 1105 is not the parking range "P".

The vehicle velocity Vs acquired at Step 1110 is "0 m/s".

The operation information acquired at Step 1115 represents that the parking support switch 24 has been operated.

When the parking support condition is not established, the CPU 11 makes a "No" determination at Step 1120, and proceeds to Step 1195 to tentatively terminate the present routine. As a result, the parking completed location is not displayed, and the steering support control is not performed. On the other hand, when the parking support control is established, the CPU 11 makes a "Yes" determination at Step 1120 to sequentially execute processes of Step 1125 through Step 1140.

Step 1125: The CPU 11 reads out the location information on the parking area PA stored in the RAM 13 through the parking area detection process. The location information on the parking area PA stored in the RAM 13 represents the location of the parking area PA in relation to the own vehicle SV at the time at which the location information of the parking area PA was stored into the RAM 13.

Step 1130: The CPU 11 specifies the "location of each parking area PA" corresponding to the "location of the own vehicle SV at the present time" based on the location information on each parking area PA which has been read out at Step 1125.

Step 1135: The CPU 11 selects, as the display parking area DPA, the parking area PA which is the closest to the location of the own vehicle SV at the present time based on the location of each parking area PA corresponding to the location of the own vehicle SV at the present time.

Step 1140: The CPU 11 executes a parking completed location display process for displaying the parking completed location of the own vehicle SV associated with the display parking area DPA. In actuality, the CPU 11 proceeds to Step 1140 to execute a subroutine represented by a flowchart shown in FIGS. 12A and 12B.

Figure 12A:
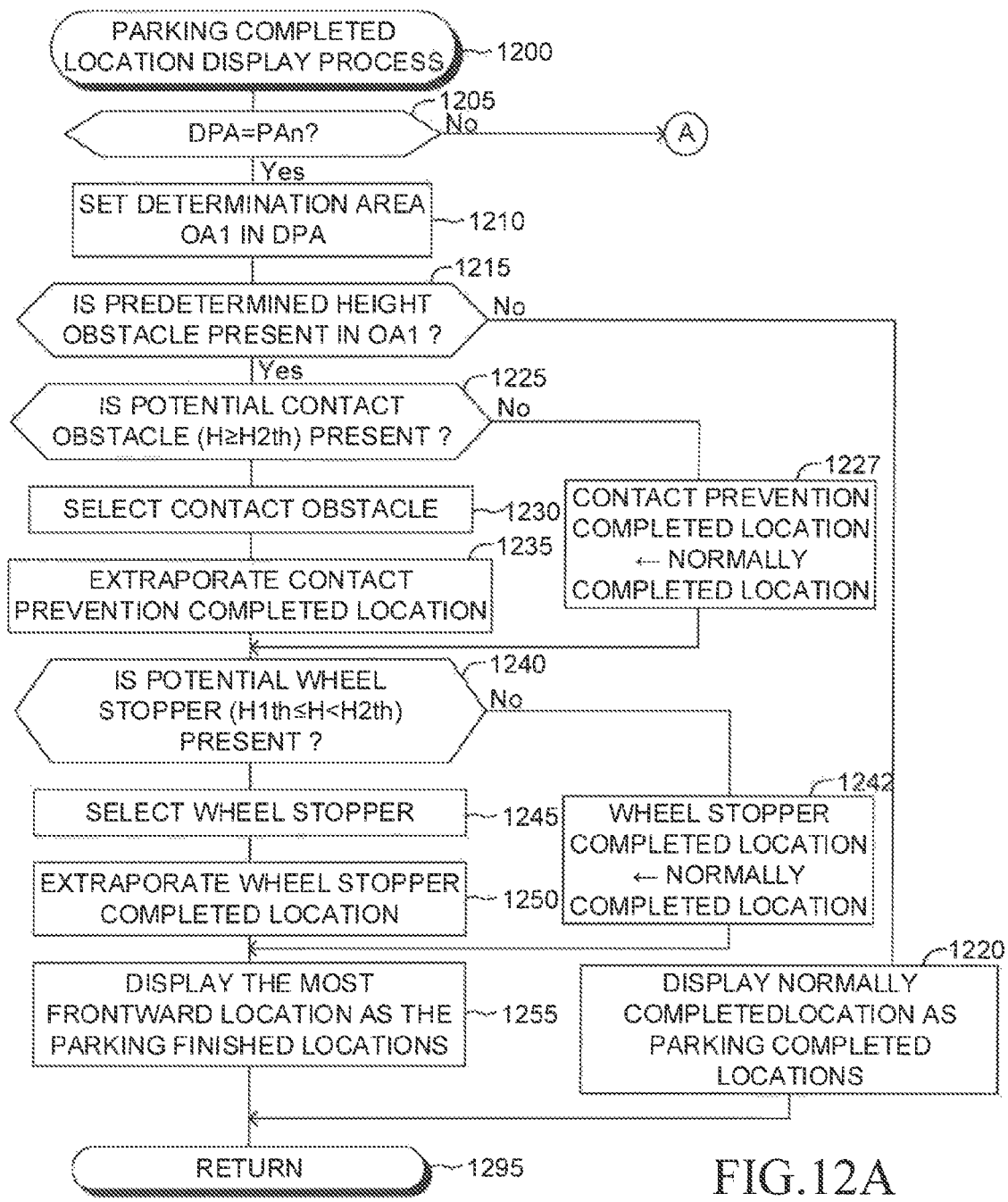
FIGS. 12A and 12B are flowcharts illustrating a routine which the CPU of the parking support ECU executes in a parking completed location display process included in the routine shown in FIG. 11.

Specifically, when the CPU 11 proceeds to Step 1140, the CPU 11 starts the process from Step 1200 shown in FIG. 12A to determine whether or not the display parking area DPA selected at Step 1135 shown in FIG. 11 is the vertical parking area PAn.

When the display parking area DPA is the vertical parking area PAn, the CPU 11 makes a "Yes" determination at Step 1205 to proceeds to Step 1210. At step 1210, the CPU 11 sets the determination area OA1 in the display parking area DPA to proceed to Step 1215.

At Step 1215, the CPU 11 determines whether or not the "predetermined height obstacle having the height H equal to or higher than the threshold height H1th" is present in the determination area OA1 set at Step 1210.

When none of the predetermined height obstacle is present in the determination area OA1, the CPU 11 makes a "No" determination at Step 1215 to proceed to Step 1220. At Step 1220, the CPU 11 displays the normally completed location as the parking completed locations 312 and 322. The normally completed location is the location of the own vehicle SV when the parking is completed in such a manner that the front end FR of the own vehicle SV corresponds to (coincides with) the area front end PFE. After executing the process at Step 1220, the CPU 11 proceeds to Step 1295 to tentatively terminate the present routine, and proceeds to Step 1145 shown in FIG. 11.

The driver takes a look at the parking completed locations 312 and 322 for the display parking area DPA, which are displayed at Step 1140. When the driver permits the parking to the display parking area DPA, in other words, when the driver hopes the parking to the display parking area DPA, the driver operates the parking support switch 24. On the other hand, when the driver does not permit the parking to the display parking area DPA, the driver touches "the other parking area PA to which the driver wants to park the own vehicle", which is displayed on the display unit 30. If none of the parking area PA to which the driver wants to park the own vehicle is displayed on the display unit 30, the driver neither operates the parking support switch 24 nor touches the display unit 30.

At Step 1145, the CPU 11 determines whether or not the driver has performed the permission operation. More specifically, the CPU 11 acquires the operation information from the parking support switch 24. When the acquired operation information represents that the parking support switch 24 has been operated, the CPU 11 determines that the permission operation has been performed. When the acquired operation information represents that the parking support switch 24 has not been operated, the CPU 11 determines that no permission operation has been performed.

When it is determined that the permission operation has been operated, the CPU 11 makes a "Yes" determination at Step 1145 to proceed to Step 1150. At Step 1150, the CPU 11 calculates the target path to the parking area PA to which the driver permits parking the own vehicle (the parking area PA to which the driver wants to park the own vehicle SV), and performs the steering support control for performing the automatic steering control in order to have the own vehicle SV travel along the calculated target path. Thereafter, the CPU 11 proceeds to Step 1195 to tentatively terminate the present routine.

Now, the steering support control is described in detail.

The CPU 11 displays "guidance information for guiding the own vehicle SV to a predetermined location for starting the parking support" in a predetermined area within the parking support screen 300. The driver has the own vehicle SV travel to that predetermined location, and stops the own vehicle SV when the own vehicle SV reaches that predetermined location, in accordance with the guidance information. When the own vehicle SV stops at that predetermined location, the CPU 11 calculates the target path from a "support start location" at which the own vehicle SV has stopped to the "parking completed location associated with the display parking area DPA" to which the driver permits parking the own vehicle SV". The target path is the shortest path which allows the own vehicle SV to reach the parking completed location with maintaining a predetermined clearance between the vehicle-body and the obstacles (i.e. the other vehicle OV, the wall, and the like). The support device adopts one of well-known approaches for calculating the target path. For example, this support device adopts the approach for calculating the target path, which is proposed in Japanese Patent Application Laid-open No. 2015-3565.

When the own vehicle SV is not able to travel to the target parking location in one time reverse moving, the CPU 11 calculates the target path which requires the own vehicle SV to move in reverse direction and move in forward direction alternately, in other words, the CPU 11 calculates the target path which causes the own vehicle SV to be parked at the parking area PA with one or more times of cutting wheel (going back and forth). The location at which the cutting wheel is to be operated is set to a location at which the distance between the own vehicle and the obstacle (i.e. the other vehicle or the wall) is equal to or longer than a predetermined distance.

When the CPU 11 finishes calculating the target path, the CPU 11 displays the guidance information for requesting the driver to reverse the own vehicle SV, on a predetermined area in the parking support screen 300. For example, the guidance information includes a message "please reverse". The driver operates the shift lever such that the shift position SP is moved to the reverse range "R" in accordance with the guidance information. When this operation is completed, the CPU 11 starts the steering support control. The driver reverses/backs the own vehicle SV in creep traveling through decreasing the depressing force of the brake pedal, while the above guidance information (reverse guidance information) is being displayed.

The CPU 11 calculates the target steering angle for having the own vehicle SV travel/move along the target path, and transmits the steering instruction representing the calculated steering angle to the EPS-ECU 31. When the CPU 11 detects the obstacle based on the camera image while the own vehicle SV is traveling in reverse, the CPU 11 modifies the parking completed location, the target path, and the like, as appropriate. The automatic steering control is performed so that the driver is able to park the own vehicle SV to the parking completed location without operating the steering wheel.

When no permission operation has not made/performed at a time point at which the CPU 11 executes the process of the Step 1145, the CPU 11 makes a "No" determination at Step 1145 to proceed to Step 1155. At Step 1155, the CPU 11 determines whether or not the driver has performed a designating operation to designate a new (different) parking area PA to which the driver wants the own vehicle SV to be parked. Specifically, the CPU 11 determines whether or not the driver has touched an area which is included in the display unit 30 and which corresponds to the parking area PA to which the driver wants to park the own vehicle SV.

When the designating operation for the new/different parking area PA has just been made/performed, the CPU 11 makes a "Yes" determination at Step 1155, and proceeds to Step 1160 to select, as new display parking area DPA, the parking area designated by the driver. Thereafter, the CPU 11 execute the process of Step 1140 again to display the parking completed location for the display parking area DPA. The CPU 11 executes the above processes after Step 1145.

In contrast, when no designating operation of the new parking area PA has not been performed at the time point at which the CPU 11 executes the process of Step 1155, the CPU 11 makes a "No" determination, and proceeds to Step 1195 to tentatively terminate the present routine.

When the predetermined height obstacle is present in the determination area OA1 at the time point at which the CPU 11 proceeds to Step 1215 shown in FIG. 12A, the CPU 11 makes a "Yes" determination at Step 1215 to proceed to Step 1225. At Step 1225, the CPU 11 determines whether or not the potential contact obstacle having a height H which is equal to or higher than the threshold height H2th is present in the determination area OA1.

When the potential contact obstacle is present in the determination area OA1, the CPU 11 makes a "Yes" at Step 1225, and proceeds to Step 1230 to select, as the contact obstacle S1, the potential contact obstacle which is the closest to the front end of the determination area OA1 (among the potential contact obstacles).

Thereafter, the CPU 11 proceeds to Step 1235 to extrapolate the contact prevention completed location which is the location of the own vehicle SV when the parking is completed in such a manner that the rear end RR of the own vehicle SV coincides with "a location away from the front end of the contact obstacle S1 by the front-end clearance FRL in the front direction of the display parking area DPA". Thereafter, the CPU 11 proceeds to Step 1240.

When no potential contact obstacle is present in the determination area OA1 at the time point at which the CPU 11 executes the process of Step 1225, the CPU 11 makes a "No" determination at Step 1225. Thereafter, the CPU 11 proceeds to Step 1227 to select the normally completed location as the contact prevention completed location, and proceeds to Step 1240.

At Step 1240, the CPU 11 determines whether or not "the potential wheel stopper having a height H which is equal to or higher than the first threshold height H1th and is equal to or lower than the second threshold height H2th" is present in the determination area OA1.

When the potential wheel stopper is present in the determination area OA1, the CPU 11 proceeds to Step 1245 to select, as the wheel stopper S2, the potential wheel stopper which is the closest to the front end of the determination area OA1. Thereafter, the CPU 11 proceeds to Step 1250.

At Step 1250, the CPU 11 extrapolates the wheel stopper completed location which is the location of the own vehicle SV when the parking is completed in such a manner that the rear end RR of the own vehicle SV coincides with "the location away from the front end of the wheel stopper S2 by the predetermined distance OH in the rear direction of the display parking area DPA". Thereafter, the CPU 11 proceeds to Step 1255. In other words, the CPU 11 extrapolates, as the wheel stopper completed location, the location of the own vehicle SV when the rear wheel contacts with the (front) end of the wheel stopper S2 to the front direction side of the display parking area DPA. Note, however, in the case where the front end of the own vehicle SV does not protrude from the area front end PFE when the own vehicle SV is parked at the wheel stopper completed location, the CPU 11 selects the normally completed location as the wheel stopper completed location.

When no potential wheel stopper is present in the determination area OA1 at the time point at which the CPU 11 executes the process of Step 1240, the CPU 11 makes a "No" determination at Step 1240. Thereafter, the CPU 11 proceeds to Step 1242 to select the normally completed location as the wheel stopper completed location. Thereafter, the CPU 11 proceeds to Step 1255.

At Step 1255, the CPU 11 displays, as the parking completed locations 312 and 322, one completed location which is the most frontward location between the contact prevention completed location and the wheel stopper completed location. In other words, the protrusion amount AOP regarding the one completed location is the greatest between the protrusion amount AOP regarding the contact prevention completed location and the protrusion amount AOP regarding the wheel stopper completed location. Thereafter, the CPU 11 proceeds to Step 1295 to tentatively terminate the present routine, and proceeds to the processes after Step 1145 shown in FIG. 11.

Figure 12B:
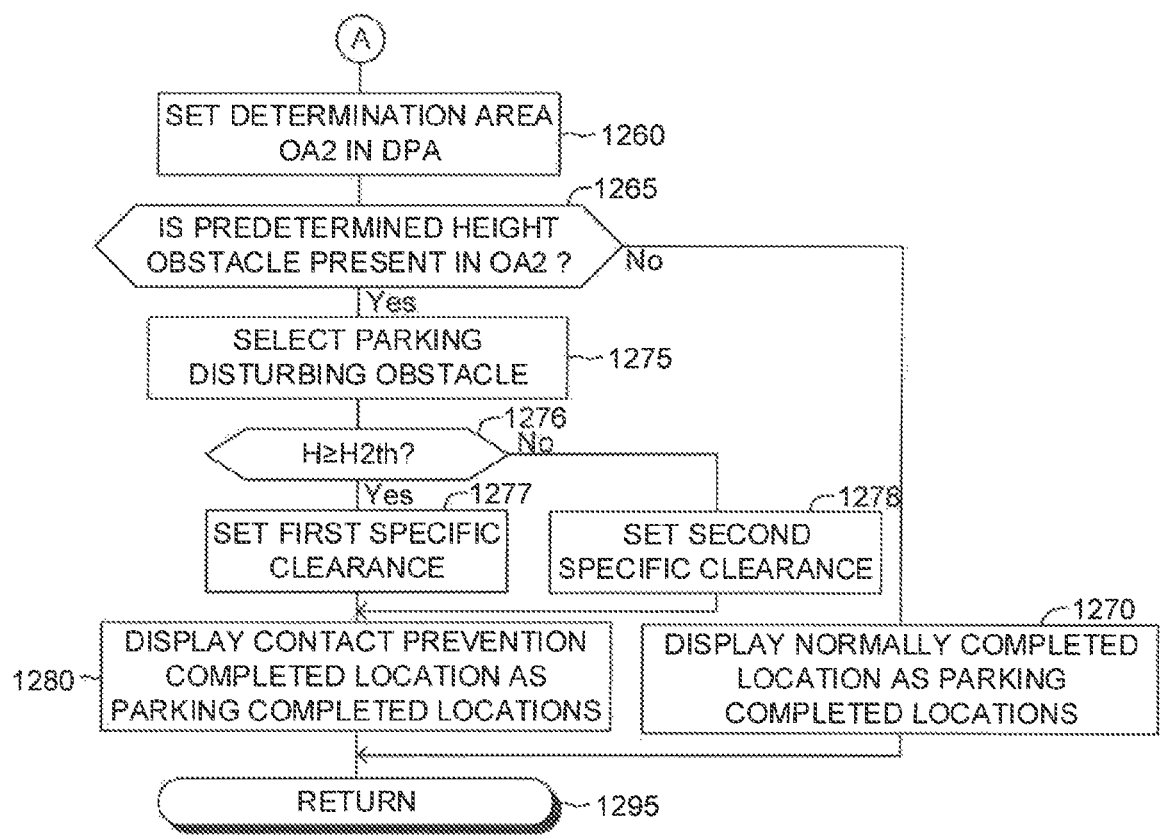

On the other hand, when the display parking area DPA is not the vertical parking area PAn, in other words, when the display parking area DPA is the parallel parking area PAp, at the time point at which the CPU 11 executes the process of Step 1205 shown in FIG. 12A, the CPU 11 makes a "No" determination at Step 1205 to proceed to Step 1260 shown in FIG. 12B. At Step 1260, the CPU 11 sets the determination area OA2 in the display parking area DPA to proceed to Step 1265. At Step 1265, the CPU 11 determines whether or not the predetermined height obstacle having a height H equal to or higher than the threshold height H1th is present in the determination area OA2.

When no predetermined height obstacle is present in the determination area OA2, the CPU 11 makes a "No" determination at Step 1265 to proceed to Step 1270. At Step 1270, the CPU 11 displays, as the parking completed area 312 and 322, the normally completed location which is the location of the own vehicle SV when the parking is completed in such a manner that the opposite entrance end of the own vehicle SV coincides with the area front end PFE of the display parking area DPA. Thereafter, the CPU 11 proceeds to Step 1295 to tentatively terminate the present routine, and proceeds to the processes after Step 1145 shown in FIG. 11.

In contrast, when the predetermined height obstacle is present in the determination area OA2, the CPU 11 makes a "Yes" determination at Step 1265 shown in FIG. 12B to proceed to Step 1275. At Step 1275, the CPU 11 selects, as the parking deterring obstacle S3, the predetermined height obstacle which is located at the most frontward side in the determination area OA2.

Subsequently, the CPU 11 proceeds to Step 1276 to determine whether or not the height H of the parking deterring obstacle S3 is equal to or higher than the threshold height H2th. When the height H of the parking deterring obstacle S3 is equal to or higher than the threshold height H2th, the CPU 11 makes a "Yes" at Step 1276 to proceed to Step 1277. At Step 1277, the CPU 11 sets the specific clearance to a first specific clearance to proceed to Step 1280. The first specific clearance is the clearance corresponding to the entrance end between the left clearance LL and the right clearance RL.

On the other hand, when the height H of the parking deterring obstacle S3 is lower than the threshold height H2th, in other words, when the height H of the parking deterring obstacle S3 is equal to or higher than the threshold height H1th and lower than the threshold height H2th, the CPU 11 makes a "No" determination at Step 1276 to proceed to Step 1278. At Step 1278, the CPU 11 sets the specific clearance to a second clearance shorter than the first specific clearance, to proceed to Step 1280. In some embodiments, the second specific clearance is set to "0" or the same value as the first specific clearance.

At Step 1280, the CPU 11 displays, as the parking completed locations 312 and 322, the contact prevention completed location which is the location of the own vehicle SV when the parking is completed in such a manner that the entrance end of the own vehicle SV corresponds to the location away from the parking deterring obstacle S3 by "the specific clearance which has been set at either Step 1277 or Step 1278" in the front direction of the display parking area DPA. Thereafter, the CPU 11 proceeds to Step 1295 to tentatively terminate the present routine, and proceeds to the processes after Step 1145 shown in FIG. 11.

As understood from the above example, when the predetermined height obstacle is present in the display parking area DPA, this support device displays, as the parking completed locations 312 and 322, the location obtained by moving the normally completed location in the front direction of the display parking area DPA by the specific distance determined based on the location of the predetermined height obstacle. The driver can recognize/see the accurate/ exact parking completed location before the vertical parking starts to be actually performed. As a result, the driver can judge whether or not the parking completed location in the display parking area DPA is appropriate before an actual parking operation (or the parking support control) is performed. The driver can find/recognize the accurate/exact parking completed location in the display parking area DPA before the steering support control starts to be performed. Therefore, this support device can avoid the situation/case where the driver needs to again perform the driving operation for parking in order to park the own vehicle SV to another parking area PA due to "the driver's judgment that that the actual parking completed location is not appropriate while the parking operation is being operated or when the parking is completed".

The present disclosure is not limited to the above embodiment, and various changes are possible within the range not departing from the object of the present invention. In some embodiments, this support device changes a display mode of the frames which are displayed as the parking completed locations 312 and 322, depending on the protrusion amount AOP. Examples of changing the display mode include an example of changing a color of the frames and an example of flashing the frames.

The example of changing the color of the frames is described.

When the protrusion amount AOP is equal to or greater than a threshold amount AOP1th, this support device displays the frames of the parking completed locations 312 and 322 in red. When the protrusion amount AOP is smaller than the threshold amount AOP1th and equal to or greater than "a threshold amount AOP2th which is set to a value smaller than the threshold amount AOP1th", this support device displays the frames of the parking completed locations 312 and 322 in orange. When the protrusion amount AOP is smaller than the threshold amount AOP2th, this support device displays the frames of the parking completed locations 312 and 322 in white. This allows the driver to visually recognize the color of each of the frames of the parking completed locations 312 and 322, so as to allow the driver to intuitively recognize the approximate protrusion amount AOP depending on the color.

The example of flashing the frames is described.

When the protrusion AOP is equal to or greater than the threshold amount AOP1th, this support device displays the frames of the parking completed locations 312 and 322 in such a manner that they are intermittently flashing. When the protrusion amount AOP is smaller than the threshold amount AOP1th, this support device display the frames of the parking completed locations 312 and 322 normally without flashing them. This allows the driver to visually recognize whether the frames of the parking completed locations 312 and 322 are intermittently flashing, so as to allow the driver to intuitively recognize the approximate protrusion amount AOP depending on whether or not the frames are intermittently flashing.

In some embodiments, this support device outputs/generates a voice message for informing the driver about the protrusion amount AOP from a speaker (not shown). For example, when the protrusion amount AOP is "30 cm", this support device outputs/generates, from the speaker, the voice message that the own vehicle SV protrudes from the parking area PA by 30 cm.

In some embodiments, at Step 1135 shown FIG. 11, this support device calculates the number of times of cutting wheel (going back and forth) for each of the parking areas PA until the parking to each of the parking areas PA is completed, and selects, as the display parking area DPA, the parking area having the number of cutting wheel which is the smallest among the parking areas PA.

In some embodiments, at Step 1135, this support device selects all of the parking areas PA stored in the RAM 13 as the display areas DPA, and thereafter, displays the parking completed locations for all of the parking areas PA on the parking support screen 300. When the driver takes a look at the parking support screen 300, the driver touches the parking area PA to which the driver wants to park the own vehicle SV. This support device performs the steering support control in such a manner that the own vehicle SV is parked in the touched parking area PA.

In some embodiments, the parking completed locations 312 and 322 are displayed as frames of which insides are fully painted or as images of the own vehicle SV stored in this support device in advance.

In some embodiments, when this support device performs the steering support control for the vertical parking and the parallel parking at Step 1150 shown in FIG. 11, this support device has the own vehicle SV park to the parking area PA with driving the own vehicle SV forward.

The normally completed location when the own vehicle SV performs the vertical parking with driving the own vehicle SV forward is the location of the own vehicle SV when the parking is completed in such a manner that the rear end RR of the own vehicle SV coincides with the area front end PFE.

The contact prevention completed location when the own vehicle SV performs the vertical parking with driving the own vehicle SV forward is the location of the own vehicle SV when the parking is completed in such a manner that the front end FR of the own vehicle SV, which is the entrance end, coincides with the location away from the front end of the contact obstacle S1 by the front-rear clearance FRL in the front direction of the display parking area DPA. The wheel stopper completed location when the own vehicle SV performs the vertical parking with driving the own vehicle SV forward is the location of the own vehicle SV when the parking is completed in such a manner that the front end FR of the own vehicle SV, which is the entrance end, coincides with the location away from the front end of the wheel stopper S2 by a predetermined distance OH' in the front direction of the display parking area DPA. The predetermined distance OH' is set to a distance between the front end of the front wheel of the own vehicle SV and the front end FR of the own vehicle SV.

In some embodiments, this support device includes front ultrasonic sensors and rear ultrasonic sensors. The front ultrasonic sensors detect the object which is present in a left front area and the object which is present in a right front area. The front ultrasonic sensors are arranged in pairs at the left side and the right side in the front part of the own vehicle SV. The rear ultrasonic sensors detect the object which is present in a left rear area and the object which is present in a right rear area. The rear ultrasonic sensors are arranged in pairs at the left side and the right side in the rear part of the own vehicle SV. Although the detection areas of the front ultrasonic sensors are different from the detection areas of the rear ultrasonic sensors, their functions are the same as each other. Hereinafter, the front ultrasonic sensors and the rear ultrasonic sensors are collectively referred to as "ultrasonic sensors", when they need not to be distinguished from each other.

The ultrasonic sensors emit/transmit pulsed ultrasonic waves to a predetermined range (for example, with a distance of a few meters) in the vehicle-width direction. The object reflects the transmitted waves. The ultrasonic sensors receive the reflected waves. This support device detects a distance between the own vehicle SV and the object which is located in either the left side or the right side of the own vehicle SV based on a time period between a time point at which the ultrasonic waves are emitted/transmitted and a time point at which the reflected waves are received. For example, the object is the other vehicle OV, the wall, the curbstone, or the like. In some embodiments, this support device fuses the detection result acquired by each of the ultrasonic sensors with the detection result of the object acquired using the camera image.

In some embodiments, the support device includes front clearance sonars (for example, four front clearance sonars) and rear clearance sonars (for example, four rear clearance sonars). The front clearance sonars detect the object which is present in either a front area or a front corner of the own vehicle SV. The front clearance sonars are arranged at a front portion (for example, a front bumper) of the own vehicle SV such that the front clearance sonars are separated from each other at a predetermined distance in the width direction of the own vehicle SV. The rear clearance sonars detect the object in either a rear area or a rear corner of the own vehicle SV. The rear clearance sonars are arranged at a rear portion (for example, a rear bumper) of the own vehicle SV such that the rear clearance sonars are separated from each other at a predetermined distance in the width direction of the own vehicle SV. Although the detection area of the front clearance sensor are different from the detection area of the rear clearance sonars, their functions are the same as each other. Hereinafter, the front clearance sonars and the rear clearance sonars are collectively referred to as "clearance sonars", when they need not to be distinguished from each other.

The clearance sonars emit/transmit pulsed ultrasonic waves. The object reflects the transmitted waves. The clearance sonars receive that reflected waves. The ultrasonic waves are emitted/transmitted in the front direction, the left front direction, the right front direction, the rear direction, the left rear direction, and the right rear direction of the own vehicle SV. This support device detects the distance between the own vehicle SV and the object which is located in the detection area based on the time period between the time point at which the ultrasonic waves are emitted/transmitted and the time point at which the reflected waves are received. In some embodiments, this support device fuses the detection result by each of the clearance sonars with the detection result of the object acquired using the camera image.

In some embodiments, when the support device receives the permission information representing that the driver permits the parking to the parking completed location displayed on the display unit 30, the support device does not perform the automatic steering, but displays a line indicative of the target path on the display unit 30 so as to support the driving operation.

What is claimed is:

1. A parking support device comprising:
    a display that displays a parking surrounding area based on a camera image acquired by a camera for photographing a surrounding area of an own vehicle and
    an electronic control unit (ECU) including at least one processor, programmed to:
    detect, based on the camera image, a parking area which has a size large enough for the own vehicle to be able to be parked;
    extrapolate a parking completed location which is a location of the own vehicle when parking to the parking area is completed, and cause the display of the extrapolated parking completed location to superimpose the extrapolated parking completed location on the parking surrounding area;

in a case where no predetermined height obstacle having a height equal to or greater than a predetermined first threshold height is present in the parking area, extrapolate, as the parking completed location, a normally completed location at which a whole vehicle body of the own vehicle is encompassed in the parking area when the own vehicle is parked; and in a case where the predetermined height obstacle is present in the parking area, extrapolate, as the parking completed location, an obstacle completed location which is a location determined by moving the normally completed location in an entering direction of the parking area by a specific distance which is determined based on a location of the predetermined height obstacle, the entering direction being a direction to an end of the parking area through which the own vehicle passes when the own vehicle enters the parking area, in a case where none of the predetermined height obstacle is present in a determination area included in the parking area, extrapolate, as the normally completed location, a location of the own vehicle when vertical parking is completed in such a manner that an opposite entrance end of the own vehicle coincides with a front end of the determination area, the determination area having a width of the front end which is within a range between a first left-right direction parking distance obtained by adding a predetermined first left-right clearance to a width of the own vehicle and a first front-rear direction parking distance obtained by adding a predetermined first front-rear clearance to a length of the own vehicle, and having a length from the front end in a rear direction which is equal to or longer than the first front-rear direction parking length, the opposite entrance end being either a front end or a rear end of the own vehicle and being opposite to an entrance end of the own vehicle from which the own vehicle firstly enters the parking area; and in a case where a first predetermined height obstacle, among the predetermined height obstacle, having a height which is smaller than a predetermined second threshold height greater than the first threshold height is present in the determination area, and no second predetermined height obstacle, among the predetermined height obstacle, having a height which is equal to or greater than the second threshold height is present in the determination area, and if the opposite entrance end of the own vehicle protrudes from the parking area when the vertical parking is completed in such a manner that a wheel among wheels of the own vehicle, which is closer to the entrance end of the own vehicle, contacts with the first predetermined height obstacle which is the closest to the front end of the determination area, extrapolate, as the obstacle completed location, a location of the own vehicle when the vertical parking is completed in that manner.

2. A parking support device comprising:

a display that displays a parking surrounding area based on a camera image acquired by a camera for photographing a surrounding area of an own vehicle, and an electronic control unit (ECU) including at least one processor, programmed to:

detect, based on the camera image, a parking area which has a size large enough for the own vehicle to be able to be parked;

extrapolate a parking completed location which is a location of the own vehicle when parking to the parking area is completed, and cause the display of the extrapolated parking completed location to superimpose the extrapolated parking completed location on the parking surrounding area;

in a case where no predetermined height obstacle having a height equal to or greater than a predetermined first threshold height is present in the parking area, extrapolate, as the parking completed location, a normally completed location at which a whole vehicle body of the own vehicle is encompassed in the parking area when the own vehicle is parked;

in a case where the predetermined height obstacle is present in the parking area, extrapolate, as the parking completed location, an obstacle completed location which is a location determined by moving the normally completed location in an entering direction of the parking area by a specific distance which is determined based on a location of the predetermined height obstacle, the entering direction being a direction to an end of the parking area through which the own vehicle passes when the own vehicle enters the parking area:

in a case where none of the predetermined height obstacle is present in a determination area included in the parking area, extrapolate, as the normally completed location, a location of the own vehicle when vertical parking is completed in such a manner that an opposite entrance end of the own vehicle coincides with a front end of the determination area, the determination area having a width of the front end which is within a range between a first left-right direction parking distance obtained by adding a predetermined first left-right clearance to a width of the own vehicle and a first front-rear direction parking distance obtained by adding a predetermined first front-rear clearance to a length of the own vehicle, and having a length from the front end in a rear direction which is equal to or longer than the first front-rear direction parking length, the opposite entrance end being either a front end or a rear end of the own vehicle and being opposite to an entrance end of the own vehicle from which the own vehicle firstly enters the parking area; and in a case where a first predetermined height obstacle, among the predetermined height obstacle, having a height equal to or greater than a predetermined second threshold height greater than the first threshold height is present in the determination area, and no second predetermined height obstacle, among the predetermined height obstacle, having a height smaller than the predetermined second threshold height is present, and if the opposite entrance end of the own vehicle protrudes from the parking area when the vertical parking is completed in such a manner that a distance between the entrance end and the second predetermined height obstacle which is the closest to the front end of the determination area coincides with the first front-rear clearance, extrapolate, as the obstacle completed location, a location of the own vehicle when that vertical parking is completed in that manner.

3. A parking support device comprising:
a display that displays a parking surrounding area based on a camera image acquired by a camera for photographing a surrounding area of an own vehicle; and
an electronic control unit (ECU) including at least one processor, programmed to:
detect, based on the camera image, a parking area which has a size large enough for the own vehicle to be able to be parked;
extrapolate a parking completed location which is a location of the own vehicle when parking to the parking area is completed, and cause the display of the extrapolated parking completed location to superimpose the extrapolated parking completed location on the parking surrounding area;
in a case where no predetermined height obstacle having a height equal to or greater than a predetermined first threshold height is present in the parking area, extrapolate, as the parking completed location, a normally completed location at which a whole vehicle body of the own vehicle is encompassed in the parking area when the own vehicle is parked; and
in a case where the predetermined height obstacle is present in the parking area, extrapolate, as the parking completed location, an obstacle completed location which is a location determined by moving the normally completed location in an entering direction of the parking area by a specific distance which is determined based on a location of the predetermined height obstacle, the entering direction being a direction to an end of the parking area through which the own vehicle passes when the own vehicle enters the parking area,
in a case where none of the predetermined height obstacle is present in a determination area included in the parking area, extrapolate, as the normally completed location, a location of the own vehicle when vertical parking is completed in such a manner that an opposite entrance end of the own vehicle coincides with a front end of the determination area,
the determination area having a width of the front end which is within a range between a first left-right direction parking distance obtained by adding a predetermined first left-right clearance to a width of the own vehicle and a first front-rear direction parking distance obtained by adding a predetermined first front-rear clearance to a length of the own vehicle, and having a length from the front end in a rear direction which is equal to or longer than the first front-rear direction parking length,
the opposite entrance end being either a front end or a rear end of the own vehicle and being opposite to an entrance end of the own vehicle from which the own vehicle firstly enters the parking area; and
in a case where a first predetermined height obstacle, among the predetermined height obstacle, having a height equal to or greater than a predetermined second threshold height greater than the first threshold height is present in the determination area, and a second predetermined height obstacle, among the predetermined height obstacle, having a height smaller than the predetermined second threshold height is present, extrapolate, as the obstacle completed location, either a first completed location and a second completed location, whichever causes a greater protrusion amount of the opposite entrance end from the front end of the determination area,
the first completed location being a location of the own vehicle when the vertical parking is completed in such a manner that a wheel among wheels of the own vehicle, which is closer to the entrance end of the own vehicle, contacts with the first predetermined height obstacle which is the closest to the front end of the determination area,
the second completed location being a location of the own vehicle when the vertical parking is completed in such a manner that a distance between the entrance end and the second predetermined height obstacle which is the closest to the front end of the determination area coincides with the first front-rear clearance.

4. The parking support device according to claim 3,
wherein the second threshold height is set to a minimum ground clearance of the vehicle body of the own vehicle.

5. The parking support device according to claim 1,
wherein the ECU is further programmed to:
in a case where none of predetermined height obstacle is present in a determination area included in the parking area, extrapolate, as the normally completed location, a location of the own vehicle when parallel parking is completed in such a manner that an opposite entrance end of the own vehicle coincides with a front end of the determination area,
the determination area having a width of the front end which is within a range between a second front-rear direction parking distance obtained by adding a predetermined second front-rear clearance to a length of the own vehicle and a predetermined distance longer than the second front-rear direction parking distance, and having a length from the front end in a rear direction which is equal to or longer than a second left-right direction parking distance obtained by adding a predetermined second left-right clearance to a width of the own vehicle,
the opposite entrance end being either a left end or a right end of the own vehicle and being opposite to an entrance end of the own vehicle from which the own vehicle firstly enters the parking area; and
in a case where the predetermined height obstacle is present in the determination area, extrapolate, as the obstacle completed location, a location of the own vehicle when the parallel parking is completed in such a manner that a distance between the entrance end and the predetermined height obstacle coincides with a predetermined specific clearance.

6. The parking support device according to claim 1,
wherein the ECU is further programmed to change a display mode of the parking completed location based on a protrusion amount of an opposite entrance end of the own vehicle from the front end of the determination area when the own vehicle is located at the extrapolated parking completed location,
the opposite entrance end being either a front end or a rear end of the own vehicle and being opposite to an entrance end from which the own vehicle firstly enters the parking area.

7. The parking support device according to claim 1,
wherein the ECU is further programmed to cause the display to display the parking completed location in either a parking area which is the nearest to the own vehicle among a plurality of parking areas or a parking area in which the own vehicle can be parked with the minimum number of times of cutting wheel required until the parking is completed among the plurality of parking areas.

* * * * *